(12) United States Patent
Polinati et al.

(10) Patent No.: US 10,708,148 B2
(45) Date of Patent: Jul. 7, 2020

(54) ACTIVITY-AND DEPENDENCY-BASED SERVICE QUALITY MONITORING

(75) Inventors: Chinna Polinati, Snoqualmie, WA (US); Purushottam Shridhar Amradkar, Redmond, WA (US); Joan Ouyang, Redmond, WA (US); Arne Lynn Gaenz, Edmonds, WA (US); Edward Ministerio Sarausad, Sammamish, WA (US); Christine Jefson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1152 days.

(21) Appl. No.: 13/230,734

(22) Filed: Sep. 12, 2011

(65) Prior Publication Data

US 2013/0064110 A1  Mar. 14, 2013

(51) Int. Cl.
*H04L 12/26*    (2006.01)
*H04L 12/24*    (2006.01)

(52) U.S. Cl.
CPC ...... *H04L 41/5035* (2013.01); *H04L 41/5038* (2013.01); *H04L 41/5067* (2013.01); *H04L 41/507* (2013.01); *H04L 41/5019* (2013.01)

(58) Field of Classification Search
USPC ................................................. 370/252, 237
See application file for complete search history.

(56) References Cited

U.S. PATENT DOCUMENTS

| | | | |
|---|---|---|---|
| 6,654,914 B1* | 11/2003 | Kaffine et al. | 714/43 |
| 7,349,340 B2* | 3/2008 | Sahai et al. | 370/235 |
| 8,339,938 B2* | 12/2012 | Taylor et al. | 370/217 |
| 8,346,225 B2* | 1/2013 | Raleigh | 455/414.1 |

(Continued)

OTHER PUBLICATIONS

Zhen, et al., "Semantic Web Service Selection Based on Context and QoS", Retrieved at <<http://ieeexplore.ieee.org/stamp/stamp.jsp?arnumber=05369375>>, International Conference on Web Information Systems and Mining, Nov. 7-8, 2009, pp. 332-335.

(Continued)

*Primary Examiner* — Yemane Mesfin
*Assistant Examiner* — Henry Baron
(74) *Attorney, Agent, or Firm* — Buckley, Maschoff & Talwalkar LLC

(57) ABSTRACT

Many services measure quality of service (QoS) according to abstract metrics based on general heuristics of QoS determinants (e.g., VoIP service providers may presume that QoS is predominantly determined by network performance). However, users' QoS perceptions are often based on their experiences with particular activities of the service, which may utilize different service paths having different QoS determinants. Therefore, QoS may be measured by identifying the activities of the service, and the dependencies among the components of such services; for respective activities and dependencies, identifying a service path from the source to the user, and the segments comprising the service path; measuring the quality of the segments of the service path; and calculating the QoS of the activity according to the QoS of the segments of the service path providing the activity. This approach may yield QoS information of greater relevance to the users' experience and with greater analytic value.

20 Claims, 11 Drawing Sheets

(56) References Cited

U.S. PATENT DOCUMENTS

| | | |
|---|---|---|
| 2006/0159026 A1 | 7/2006 | Wu et al. |
| 2008/0049631 A1* | 2/2008 | Morrill ............... H04L 41/5009 370/250 |
| 2008/0181118 A1* | 7/2008 | Sharma et al. ............... 370/238 |
| 2009/0227251 A1 | 9/2009 | Lei et al. |
| 2010/0265826 A1* | 10/2010 | Khasnabish et al. ......... 370/237 |

OTHER PUBLICATIONS

Deora, et al., "A Quality of Service Management Framework Based on User Expectations", Retrieved at <<http://www.csd.uoc.gr/~hy565/newpage/docs/pdfs/papers/QoS%20Management%20of%20Web%20Services%20Based%20on%20User%20Expectations.pdf>>, International conference on service-oriented computing, LNCS 2910, Dec. 15-18, 2003, pp. 104-114.

Sanchez-Macian, et al., "A Framework for the Automatic Calculation of Quality of Experience in Telematic Services", Retrieved at <<http://citeseerx.ist.psu.edu/viewdoc/download?doi=10.1.1.66.2123&rep=rep1&type=pdf>>, 13th HP-OVUA Workshop, Côte d'Azur, May 24, 2006, pp. 6.

Wijnants, et al., "Investigating the Relationship between QoS and QoE in a Mixed Desktop/Handheld Gaming Setting", Retrieved at <<http://conferences.sigcomm.org/co-next/2009/workshops/student/papers/Wijnants.pdf>>, Proceedings of the 5th ACM International Conference on emerging Networking EXperiments and Technologies (CoNEXT), Dec. 1, 2009, pp. 29-30.

Wac, Katarzyna, "Towards QoS-awareness of Context-aware Mobile Applications and Services", Retrieved at <<http://eprints.eemcs.utwente.nl/7085/01/Wac_PhDStudentSymposium_OnTheMove_2005.pdf>>, on the Move to Meaningful Internet Systems: CoopIS, DOA, and ODBASE (OTM), Sep. 31, 2005, pp. 751-760.

Georgievski, et al., "Enhancing User Experience for Networked Multimedia System", Retrieved at <<http://subs.emis.de/LNI/Proceedings/Proceedings63/GI-Proceedings.63-6.pdf>>, Proceedings of the 4th International Conference on Information Systems Technology and its Applications (ISTA), 2005, pp. 73-85.

"LiveAction All-In-One QoS Expert Software for Managing Cisco Quality of Service", Retrieved at <<http://www.techrepublic.com/downloads/liveaction-all-in-one-qos-expert-software-for-managing-cisco-quality-of-service/2705919>>, Retrieved Date: Jun. 14, 2011, p. 1.

* cited by examiner

400

| SERVICE PATH 404 | ACTIVITIES | | |
|---|---|---|---|
| | 402 LOGGING IN | 402 PURCHASING | 402 STREAMING |
| 406 | FRONT END SERVER | FRONT END SERVER | FRONT END SERVER |
| | | COMMERCE SERVER | |
| | | TRANSACTION SERVER | |
| 406 | ACCOUNT SERVER | ACCOUNT SERVER | ACCOUNT SERVER |
| 406 | FRONT END SERVER | FRONT END SERVER | MEDIA SERVER |
| 406 | SERVICE ISP 1 | SERVICE ISP 1 | SERVICE ISP 2 |
| 406 | DISTANCE NETWORK | DISTANCE NETWORK | DISTANCE NETWORK |
| 406 | USER ISP | USER ISP | USER ISP |
| 406 | LOCAL AREA NETWORK | LOCAL AREA NETWORK | LOCAL AREA NETWORK |
| 406 | NETWORK ADAPTER | NETWORK ADAPTER | NETWORK ADAPTER |
| 406 | WEB CLIENT | WEB CLIENT | CODEC |
| 406 | WEB BROWSER | WEB BROWSER | WEB BROWSER PLAYER |

FIG. 4

ACTIVITY-AND DEPENDENCY-BASED SERVICE QUALITY MONITORING

BACKGROUND

Within the field of computing, many scenarios involve the monitoring and use of the quality of a service provided by a source (e.g., a server) to various users. For example, the usability of a voice-over-IP (VoIP) telephony service may be determined by factors such as throughput and latency; e.g., acceptable configurations of the service may deliver voice communication with high audio resolution, low latency, and a reduction of noise and/or echoing, whereas a poor configuration of the service may introduce excessive lag in the communications between the parties. Additional quality-of-service (QoS) metrics may be measured for many such services, including the sustainable framerate and resolution of video provided by a streaming media service; the promptness and throughput of email hosted by an email server, or a website hosted by a webserver; the responsiveness and reliability of a game server; the transfer rates of a file service; and the execution rates of applications by a remote execution service. Additionally, many such services and servers may depend upon each other, and such dependencies may affect the service quality metrics of services involving such servers.

In these and other scenarios, the provider may monitor the network parameters of the service as provided to various users in order to identify techniques for improving the quality of the service. For example, because the quality of a VoIP service is often determined by latency and rate of throughput, a provider of a VoIP service may monitor the data throughput of its servers, and may provide to the user software to report the throughput achieved at the client. The VoIP service provider may also advise the client on techniques for achieving improved quality of service (e.g., that in some circumstances, adjusting router settings may improve the achieved quality of service), and may allow users to report the overall quality of service. If service is determined to be poor in a discrete set of circumstances, the VoIP service provider may dispatch a technician to investigate the cause of the poor service, and may respond accordingly (e.g., by generating and distributing a patch for a software problem, by reconfiguring a server to achieve improved throughput, or by advising users to adjust the configuration of their hardware or software systems).

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Attempts to assess the quality of service (QoS) of a particular service often focus on measurable technical details of the service based on heuristics, estimates, or ideas of the providers as to the determinant elements of the service. For example, a voice-over-IP service provider may understand that the service quality of the VoIP service is often determined by network connection characteristics, and in response to reports of poor service, may focus on measuring and improving the metrics of the network connection characteristics; and if this adjustment does not improve diminished performance as reported by users, the provider may seek to identify and address a different cause of the diminished performance.

However, in many circumstances, this diagnostic process may be an inefficient mechanism for identifying the determinants of service quality and opportunities for improvement. It may be appreciated that many services comprise a set of activities, each of which may be provided by a service to a user along different service paths. For example, a voice-over-IP service may enable a user to take many actions, including: establishing an account with the VoIP service; remitting payment for the service; initiating a session through the VoIP service; receiving a session through the VoIP service; sending video and/or audio to the VoIP service; and receiving video and/or audio from the VoIP service. Each of these activities may involve a different service path from the source of the service (e.g., the service provider) to the user, and each service may comprise a distinctive set of segments. For example, the service path for remitting payment for an account may involve a receipt of the request by a front end server; an interaction with a commerce server that interfaces with a billing server for the payment type rendered by the client; an interaction with an account server that marks the user's account as paid; another interaction with the front end server to generate a response page; and an interaction with the user's web browser to render the response page for the user, as well as the network connections to transmit the user's request from the user's web browser to the front end server and to transmit the response from the front end server to the user's web browser. By contrast, the service path for initiating a session may involve a different service path, involving an interaction with the front end server to receive the request; an interaction with an account server to verify that the user is permitted to establish a connection; an interaction with an egress server to initiate the connection from the VoIP server to another party involved in the session; and either a direct exchange of the session media (video and/or audio) between the other party and the user, or a mediated transaction through the session servers of the VoIP service. Additional segments that may be involved along these service paths for different activities include the capturing and/or rendering hardware utilized by the user; a VoIP software client of the user; the networking hardware of the user's computer system; the local area network of the user; the user's internet service provider (ISP); the ISP of the service; and the backbone connecting the user's ISP with the ISP of the service.

In view of these considerations, it may be appreciated that different activities may involve a different sequence of segments comprising the service path from the source of the activity to the user. However, the service quality of a segment may vary, which may determine the user's perceived service quality for an activity that involves the segment. Moreover, the user may perceive the quality of service (QoS) for respective activities of the service, rather than for the service as a whole. That is, although many service providers focus on a technical metric of the service that may generally affect the quality of the service, users attribute the quality of the service to the quality of specific activities performable within the service—many of which may be not be particularly determined by the segments of the service that enable the technical metrics that the service provider ordinarily measures. For example, users may complain of poor quality in a voice-over-IP service, and the provider of the VoIP service may endeavor to address these complaints by measuring and improving the throughput and latency of the network communications for these users, since these network characteristics are often determinative of the service quality of the VoIP service. However, this approach may be unsuccessful for three reasons. First, the users' complaints may stem from perceived poor service quality in activities that are not particularly affected by these network characteristics, such as timeouts while attempting to remit payment for the account (which may be caused by inadequate resources of the commerce server) or slow responsiveness while attempting to initiate a session (which may be caused by poor design of the software client for the VoIP service). Second, the users' complaints may stem from perceived poor service quality in activities that are often affected by these network characteristics, but the particular causes of poor service quality may arise in segments other than those resulting in the network characteristics; e.g., the user may complain of chronically poor audio communication latency during a session, but this latency may be caused by a poor design of the user's audio hardware or a problem with a session server of the VoIP service, not by the segments involving the network. Third, even if a problem is caused by the network characteristics, the VoIP service may have difficulty diagnosing which segment of the network is causing the network characteristics, and underinformed attempts to improve the network characteristics (e.g., recommending that the user acquire a faster router or a stronger wireless network signal, or increasing the outbound network capacity of the VoIP service) may fail to address the segment limiting the network characteristics, and may therefore fail to improve the service quality of the service (e.g., the ISP of the user may be throttling the network characteristics of the service). Thus, attempts of the service to diagnose and improve service quality that focus on general service metrics, rather than on the service quality of the segments comprising the service paths of the activities performed by the users of the service, may be inefficient, ineffective, protracted, and frustrating to users.

Presented herein are techniques for measuring the quality of a service that may facilitate the monitoring of the service, the diagnosis of service quality problems of the service, the prioritization of service quality problems, and the allocation of resources to improve the service. According to these techniques, the service may be characterized according to the activities of the service. For example, a VoIP service may identify the activities of creating an account; remitting payment for an account; initiating a communication session; receiving a communication session; sending video or audio during a communication session; and receiving video or audio during a communication session. As another example, an email service provider may identify the activities of the email service as establishing an account; logging into the email account; viewing a mailbox (such as the inbox or the sent items mailbox); generating an outgoing message; sending an outgoing message; receiving an incoming message; searching the mailbox for particular messages; and performing mailbox cleanup tasks. For respective activities, the service provider may identify the service path of the activity; may identify the segments comprising the service path; and may measure the service quality of the segment while utilized in the activities of the user(s). Service quality metrics may then be measured for respective activities of the service based on the service quality of the segments comprising the service path of the activity; and the service quality of the service may be generalized according to the service quality metrics of the activities. The service quality may also be monitored for segments representing a dependency among two or more services or other components, which may affect the service quality of services involving any of the depended-upon components. This approach may enable an end-to-end assessment of the qualities of the service that are experienced by the user, and, by focusing on the activities performed by the user, may generate service quality information that is more relevant to the users' experiences and perceptions of the service quality of the service than generalized characteristics (e.g., throughput) that may be more abstract and irrelevant to the users' perceptions of the service quality of the service.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 4 is an illustration of an exemplary identification of the service paths of respective activities of the service provided by the architecture illustrated in the exemplary scenario of FIG. 3.

DETAILED DESCRIPTION

Figure 1:
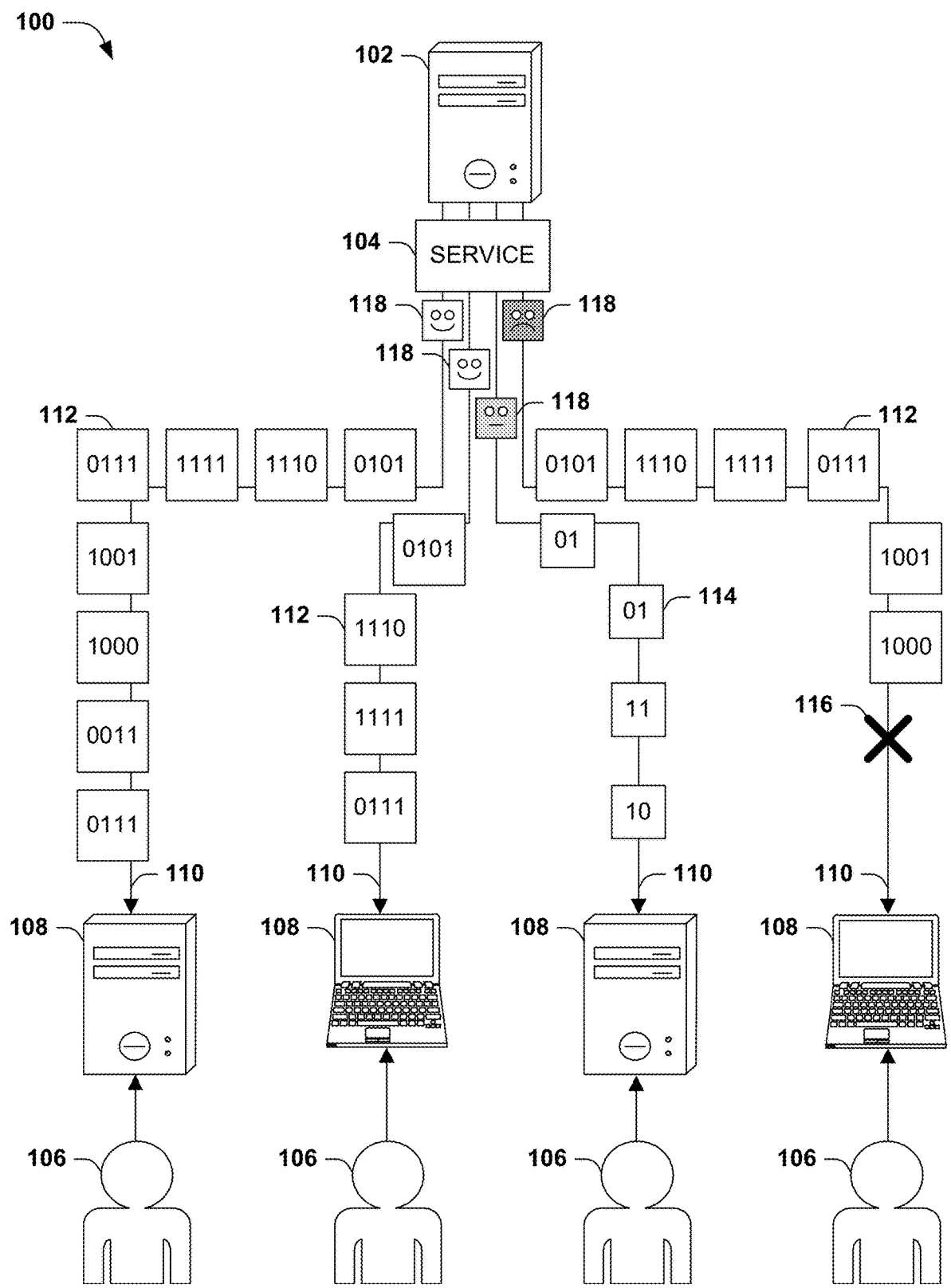
FIG. 1 is an illustration of an exemplary scenario featuring a measurement of quality of service (QoS) of a service provided to a set of users.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

Within the field of computing, many scenarios involve an evaluation of the quality of a service provided to a set of users. Such service may include, e.g., realtime communication services, such as text, audio, and video, involving one or more participants (possibly including non-participating recipients), using protocol such as Internet Relay Chat (IRC), instant messaging, Simple Messaging Service (SMS), or Voice-over-IP (VoIP) services; email delivery services; streaming media services, such as music and video streaming services; file transfer services; and websites provided by webservers. In these and other examples, a service is provided to a set of users, often involving the transmission of data over a local area network or a wide area network, where one or several parties is connected to a backbone of the network via a network service provider (e.g., an internet service provider (ISP) connecting a user or a service to the internet).

Such services may be presented to users with varying levels of quality. For example, in realtime communication services, higher-quality services may present faster delivery of messages, less delay between the capturing of audio or video and the presentation of the captured audio or video to other users, or the presentation of audio or video at higher resolution or framerates to present higher-quality media-based communications, while lower-quality services may introduce extensive or inconsistent lag, audio or video artifacts (e.g., echoes, noise, or distortion), intermittent pauses, or diminished media framerate or resolution. In the context of media streaming, higher-quality services may present consistently high resolution and framerate audio or video, while lower-quality services may present low-resolution or low-framerate video, more distorted sound, and inconsistencies. In the context of file and web service, higher-quality service may result in faster fulfillment of requests (e.g., promptly responsive navigation between pages or initiation of file transfers) and/or faster throughput (e.g., faster completion of page rendering or file upload or download). The quality of the service may significantly determine users' satisfaction with the service and the degree of use and scope of usage of the service by the users, and lower-quality services may discourage users from consuming the service and may result in a loss of users, particularly if competing services are available with comparable costs and with higher quality.

Accordingly, it may be desirable for an administrator of the service to monitor the quality of the service (QoS), and particularly to devise metrics of the service quality of the service. This monitoring of particular metrics may provide a quantitative model of the quality of the service, and an objective metric of a determinant of the service quality may be adjusted in order to adjust the quality of the service. Additionally, inferences of customer response to adjustments in the metrics may be utilized in business cases, such as decisions of whether to upgrade or downgrade service in view of the forecasted changes in user demand for the service.

FIG. 1 presents an illustration of an exemplary scenario 100 featuring measurements of service quality metrics 118 for a service 104, such as internet access, voice-over-IP (VoIP) service, a streaming media service, or a file sharing service. In this exemplary scenario 100, the service 104 is provided by a server 102 to a set of users 106 of respective devices 108 over a connection 110, such as a mobile cellular connection or the internet coupled with each user's connection to the internet, across which packets 112 of data may be sent or received. The service 104 may also be accessed through a variety of devices 108, such as workstations, other servers, notebook computers, tablets, smartphones, portable media players, game devices, and service-compatible appliances (e.g., phones that are capable of utilizing a voice-over-IP service over a network). Service quality metrics 118 may be devised by the provider of the service 102, and may be detected and recorded as a measure of the quality of the service 102 provided to each user 106. In this exemplary scenario 100, the service quality metrics 118 comprise a download transmission rate (e.g., the maximum rate at which data may be sustainably delivered from the service 104 to the device 108 over the connection 110), and is depicted as the sizes of packets 112 along the connection 110. An administrator of the service 104 may choose this metric due to a predictable impact on service quality for the service 104; e.g., the user satisfaction of a streaming media service is often determined by sustainable quality of the streamed media, which is determined by the download rate. For example, the server 102 may measure the outbound transmission rate achieved to respective users 106, and/or may configure a software client provided to each user 106 to detect the inbound transmission rate and report it to the server 102. Accordingly, satisfactory bandwidth may be detected for a first user 106 and a second user 106, and a positive service quality metric 118 may be detected for the respective connections 110. However, the connection 110 to a third user 106 may exhibit diminished bandwidth (e.g., a sustainable but diminished transmission rate), and a mediocre service quality metric 118 may be detected; and for a fourth user 106, an initially satisfactory transmission rate may be interrupted by a communication failure 116, and may result in a poor service quality metric 118. In this way, the service quality of the service 104 may automatically detected and reported in the form of service quality metrics 118, which may prompt an administrator of the service 104 to assess the nature and severity of unsatisfactory service provision and to make adjustments that may achieve service quality improvements.

However, in many scenarios, the detection and use of service quality metrics 118 in this manner may not lead to useful information for achieving service quality improvements. In a first such scenario, a poor experience of a user 106 with a service 104 may not be based on the characteristic of the service 104 represented by the selected service quality metric 118. For example, a user 106 may perceive the service 104 to be slow, and the user 106 and/or an administrator of the service 104 may attribute the slow responsiveness to the achievable network transmission rate. However, the aspect of the service 104 that the user 106 has perceived as "slow" may not depend at all on the transmission rate; e.g., the user 106 may be interacting solely with the software client for the service 104, such as altering the settings of the client, and an unsatisfactorily designed software client may exhibit poor responsiveness to user input. Accordingly, the software client is not using the network connection at all during these activities—indeed, the network may not even be connected—and the efforts and resources of the user 106 and/or administrators of the service to improve the network capacity for the device 108 of the user 106 may have no effect on the service quality perceived by the user 106.

In a second such scenario, poor service quality may be perceived for an aspect of the service 104 that is often determined by the service characteristic represented by the service quality metric 118, but the cause of the poor service quality may, in fact, have a different cause that is not related to this service characteristic. For example, a user 106 of a voice-over-IP service may report poor transmission quality, which is often caused by poor network capacity, and the user 106 and/or an administrator of the service 104 may endeavor to improve the network capacity of the device 104 of the user 106. However, upon achieving an improvement in the network capacity, the user 106 may find that the perceived service quality is not significantly improved, because the cause of the poor transmission quality may be inadequate resources of the device 104 of the user 106 (e.g., too little memory or insufficient processing capabilities to present the voice audio service with consistently high throughput, or software or hardware incompatibilities that introduce delays, noise, or distortion in the audio stream). Indeed, the user 106 and/or administrator may even detect a poor service quality metric 118 during the use of the service 104 by the user 106, such as a low network transfer rate; however, this service quality metric 118 may be caused not by the capacity of the network, but by an inadequate processor that is incapable of processing data in realtime at a higher data transfer rate. Indeed, the service quality metric 118 may even be misleading in these scenarios; e.g., an administrator of the service 104 may even presume that a user 106 is experiencing satisfactory service quality as evidenced by a high service quality metric 118 detected during the utilization of the service 104 (e.g., measurably high data throughput), but the user 106 may nevertheless exhibit diminished service quality leading to user dissatisfaction.

In a third such scenario, a poor service quality experienced by a user 106 may be caused by a characteristic of the service 104 that is evidenced by a poor service quality metric 118; e.g., the user 106 may experience poor VoIP quality primarily due to an unsatisfactory network transfer rate, and the user 106 and/or an administrator of the service 104 may endeavor to improve the service quality of the user 106 by improving the network throughput from the service 104 to the device 108 of the user 106. However, the types of service quality metrics 118 gathered by the service 104 may be unhelpful in diagnosing the cause of the unsatisfactory network transfer rate. For example, a bandwidth monitor implemented on the server 102 providing the service 104 a bandwidth monitor implemented on the device 108 may both demonstrate poor network throughput from the server 102 to the device 108, but the network throughput is determined by many factor, including the network hardware and load of the server 102; the local area network of the service that connects the server 102 to an internet service provider (ISP); the ISP to a long-distance network, such as a backbone of the internet; the throughput across the backbone; the throughput from the ISP to the user 106; the "last-mile" connection from the ISP to the user's residence; the throughput of the local area network (LAN) of the user 106; and the connection of the device 108 of the user 106 to the user's LAN (including the network cabling and/or wireless network connection, device network adapter, and software network drivers operating on the device 108). The measures of throughput at the ends of this connection provide insufficient information about which links in this network path are exhibiting poor performance and may be improved in order to raise the service quality experienced by the user 106. Thus, the user 106 and/or an administrator of the service may have to spend considerable resources in an in an iterative trial-and-error process, experimenting with the network connection and testing the resulting network throughput metrics, in order to improve the service quality of the service 104.

Figure 2:
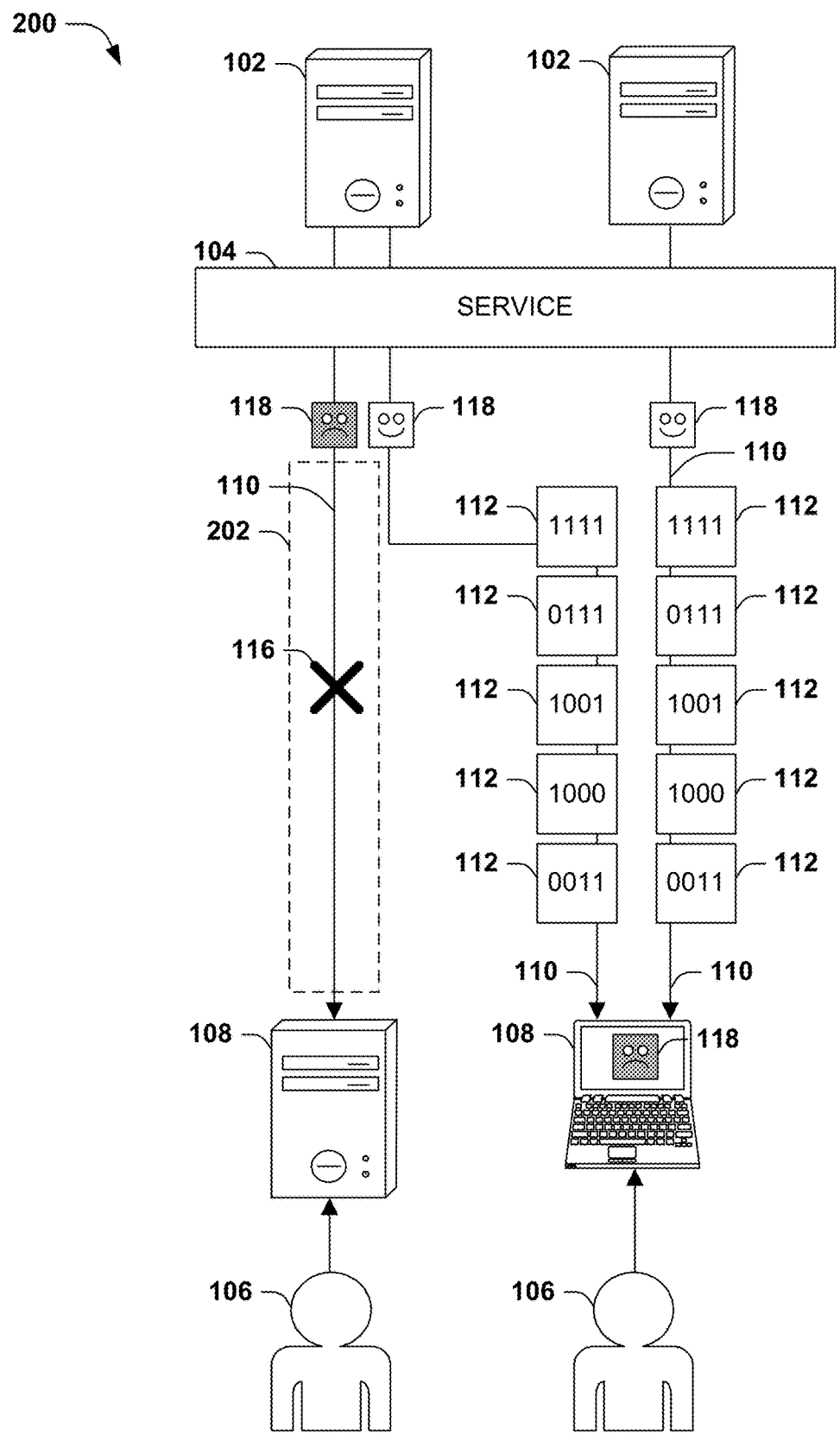
FIG. 2 is an illustration of an exemplary scenario depicting some limitations that may arise in some service quality metrics of a service provided to a set of users.

FIG. 2 presents an illustration of an exemplary scenario 200 featuring two examples of poor service quality experiences by users 106 of a service 104 that may be inadequately reflected in the service quality metrics 118 utilized by the administrators of the service 104. In this exemplary scenario 200, two servers 102 are configured to provide a service 104 to users 106 of devices 108 capable of accessing the service 104, and the administrators of the service 104 may select and monitor network throughput to the various users 106 as a service quality metric 118. However, in each case in this exemplary scenario 200, the service quality metric 118 is of little use, and may actually interfere with the provision of a high-quality service 104 to the users 106. As a first example, a first user 106 may experience poor service quality due to a failure 116 of the network connection to the server 102, which may be reflected in the service quality metric 118 (e.g., an indication that no data is reaching the user 106). However, the failure 116 arises somewhere within the network connection 202 between the user 106 and the server 102, and the service quality metric 118 may provide no diagnostic information as to where the failure is occurring (e.g., with the networking hardware of a server 102; with the connection of the server 102 to the service LAN; with the performance of the service LAN; with the connection of the LAN to a service ISP; within the ISP; with the network backbone of the network connecting the ISP of the service 104 with the ISP of the user 106; within the ISP of the user 106; within the "last-mile" connection to the user's residence; within the LAN hardware of the user 106; or with the connection of the user's device to the user's LAN). The user 106 and/or administrator(s) of the service 104 may have to utilize other diagnostic techniques (e.g., traceroute evaluation) to determine where the failure 116 is arising. As a second example, a second user 106 of the service 104 may access the service concurrently from a first server 102 and a second server 102 providing the service 104 (e.g., concurrently streaming two media objects from a media library, or receiving audios streams from two other individuals in a VoIP group session), and each server 102 may detect an acceptable service quality metric 118 in the provision of the service 104 to the user 106 (e.g., an acceptable throughput of data packets 112 to the device 108 of the user 106). Nevertheless, the user 106 may experience poor service quality on the device 108, e.g., because of an incapability in the software client in the concurrent streaming of two media objects or in the meshing of the audio streams of two users 106 in a group VoIP session. Thus, for the provision of the service 104 to the second user 106, the detection and reporting of service quality metrics 118 is not only unhelpful but misleadingly suggests that the user 106 is experiencing an acceptable service quality.

B. Presented Techniques

In view of these considerations, it may be desirable to devise techniques for assessing service quality in a manner that is more relevant to the experiences of users 106 and/or more diagnostic of the causes of diminished service quality. Therefore, it may be appreciated that conventional service quality evaluation techniques are often based on abstract metrics selected using heuristic prediction of relevance in any scenario (e.g., a prediction that a measure of download network capacity may be useful for addressing any diminished service quality difficulties in a network-based service 104). It may be observed that such techniques may present information at a relatively coarse granularity (e.g., the notion that the performance of a network from a source to a user, potentially comprising a large number of diverse components having different performance characteristics, may be represented as a single metric), and/or may not represent all of the determinants of the quality of service (e.g., the service quality of a voice-over-IP service is determined not only by the network characteristics, but also by the quality of the hardware and software used by each participant, the performance of a software VoIP client utilized by each participant, the performance of the servers 102 providing the voice-over-IP service 104, and the presence or absences of incompatibilities in the interfaces of these components). Additionally, it may be desirable to choose service quality metrics 118 that are more closely related to the experiences of a user 106 with a service 104. In particular, users 106 may experience the service 104 as a set of activities, each of which may exhibit a different quality of service, due to the different service path involved in providing the service 104 to the user 106 (e.g., a different sequence of hardware, software, and network components and interfaces therebetween). Therefore, it may be advantageous to select service quality metrics 118 not for respective components of the service 104 that may or may not relate to particular experiences of the user 106, but rather for the respective activities of the service 104, such that each service quality metric 118 represents the quality of the end-to-end experience perceived by the user 106 while performing the activity of the service 104. Thus, each service quality report or complaint of a user 106 while performing an activity may be reflected by a service quality metric 118 of the service 104. This approach may therefore yield more relevant and diagnostic information; e.g., rather than presumed to improve the overall quality of the service 104 according to a heuristic (e.g., a presumption that improving the network throughput of a voice-over-IP service may generally improve many aspects of the service 104), the detection and use of service quality metrics 118 for respective activities may directly and proportionally reflect the experiences of users 106 while performing that activity.

Presented herein are techniques for detecting the service quality of a service 104 according to a different set of service quality metrics 118. In accordance with these techniques, a service 104 may be identified as a set of activities that are performable by a user 106 of the service 104. As a first example, a voice-over-IP service may comprise a collection of such activities as registering a VoIP account; remitting payment for the VoIP account; initiating a session through the VoIP service; receiving an invitation to join a session through the VoIP service; sending audio or video as part of a VoIP session; and receiving audio or video as part of the VoIP session. As a second example, a streaming media service may comprise the activities of registering an account with the media service 104; logging into an account with the media service 104; performing searches for media through the media service 104; purchasing a media selection through the media service 104; and streaming media from the streaming media service. As a third example, an email service may comprise the activities of the email service as establishing an account; logging into the email account; viewing a mailbox (such as the inbox or the sent items mailbox); generating an outgoing message; sending an outgoing message; receiving an incoming message; searching the mailbox for particular messages; and performing mailbox cleanup tasks. For respective activities, a service path may be identified, comprising the sequence of components and interfaces comprising the path utilized by the service 104 to enable the user 106 to perform the activity.

Additionally, for respective activities, a series of segments may be identified. For example, for the streaming media service, a first service path may be identified for the activity of purchasing access to a streaming media object, and may involve the segments of receiving the request (by a front end server); initiating a charge (by a commerce server); processing the charge (by a transaction server); recording the license acquired by the user 106 (by an account server); generating and sending a response page (by the front end server); transmitting the response page (respectively performed by a first ISP of the service, the long-distance network, and the ISP of the user 106); receiving the response page (by the network adapter of the device 108 of the user 106); processing the response (by a web client executing in a web browser of a device 108 operated by the user 106); and rendering the response page for the user 106 (e.g., by the web browser of the device 108 of the 106). By contrast, a second service path of the streaming media service may involve a request to stream a media object to the device 108 of the user 106, and may involve the activities of receiving the request (by the front end server); verifying the license of the user 106 to the requested media object (by the account server); initiating the streaming of the media object (by a media server); transmitting the streaming of the media object to the user (respectively performed by a second ISP of the service, the long-distance network, and the ISP of the user 106); receiving the streamed media (by the network adapter of the device 108 of the user 106); deciding the streamed media (by a codec installed on the device 108 operated by the user 106); and playing the media object (e.g., within a web browser player executing within a web browser of the user 106). For each segment in the service path of an activity, a service quality metric 118 may be detected while the activity is provided to the user 106, and the service quality of the activity may be calculated from the service quality metrics 118 of the respective segments of the activity. In turn, the service quality of the service 104 may be computed according to the service quality metrics of the respective activities comprising the service 104. In this manner, the service quality of a service 104 may be identified based on the service quality of the activities performable by the users 106 of the service 104, and at a granularity that may promote diagnosis and remediation of the determinants of unsatisfactory service quality of the service 104.

Figure 3:
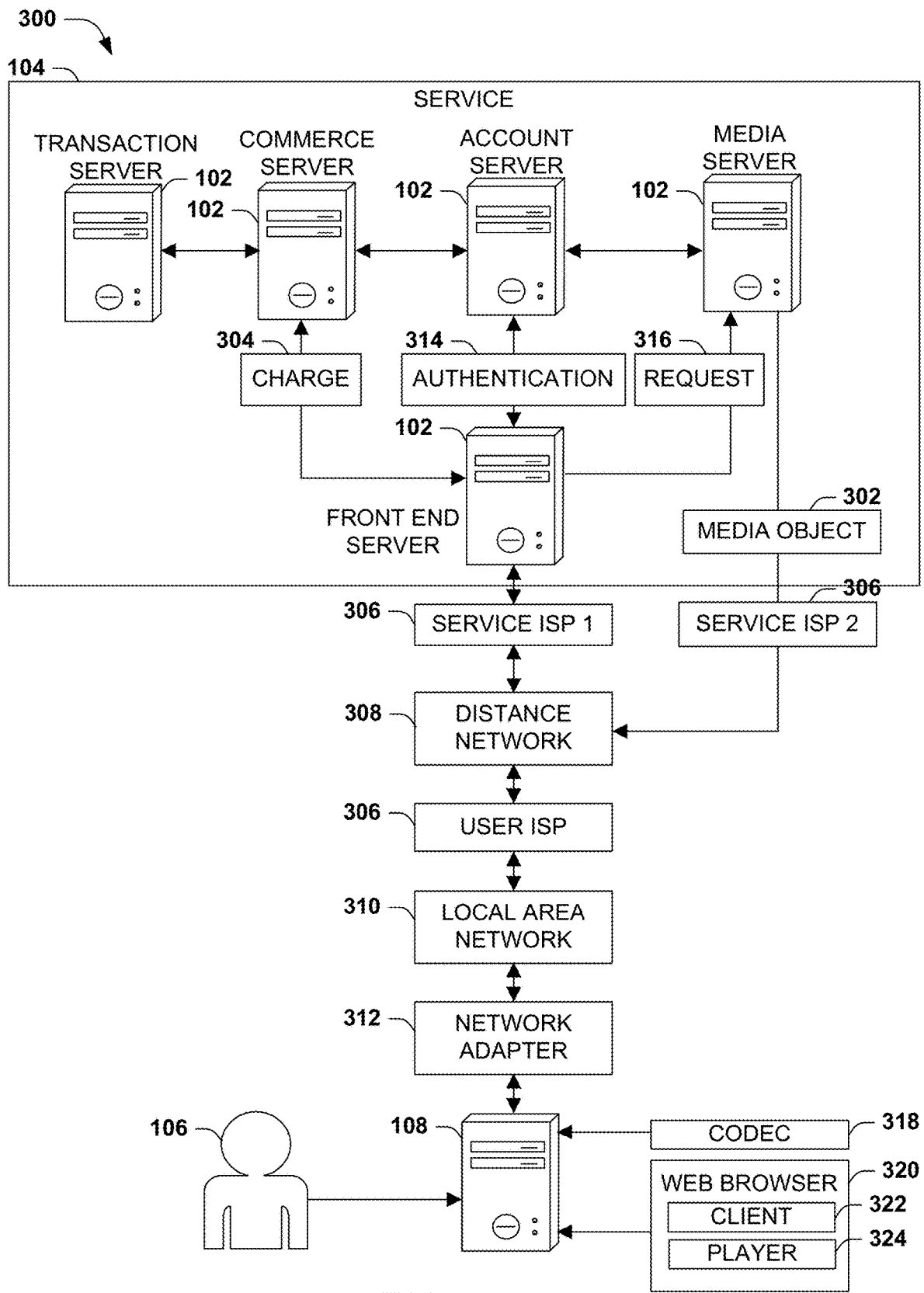
FIG. 3 is an illustration of an exemplary scenario featuring an architecture of a service provided to a user.
Figure 5:
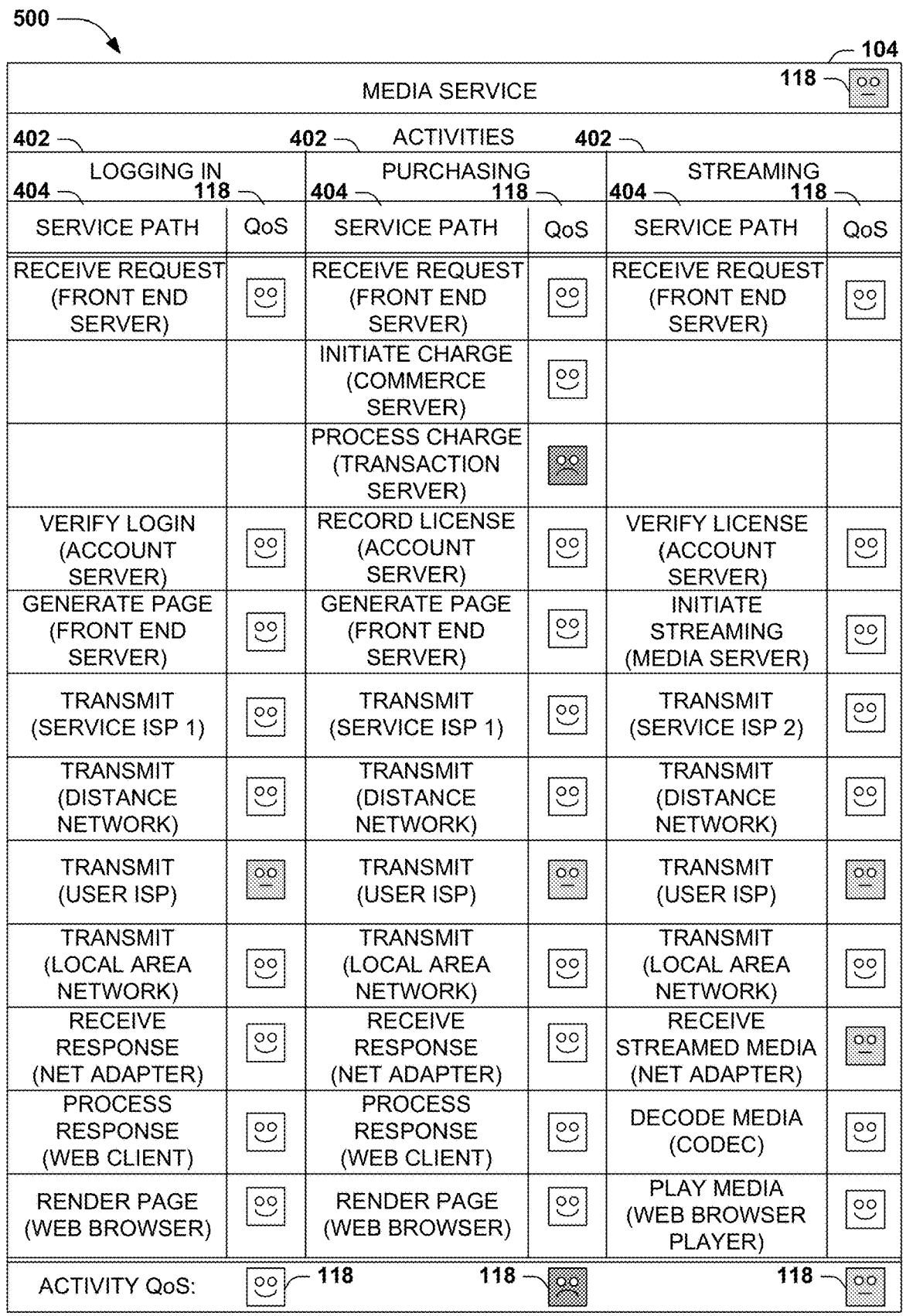
FIG. 5 is an illustration of a measurement of service quality for the service presented in FIG. 4 according to service quality metrics of respective segments of the service paths of respective activities in accordance with the techniques presented herein.

FIGS. 3, 4, and 5 together present an illustration of an exemplary scenario featuring a selection, detection, and use of service quality metrics 118 of a service 104 in accordance with the techniques presented herein. In the exemplary scenario 300 of FIG. 3, the service 104 comprises a media streaming service, through which users 106 may find media objects 302 of interest, purchase a license to the media object, and request to stream media objects for which the user 106 has purchased a license. However, the media streaming service 104 may involve a significant number of interoperating components that are configured to enable users 106 to perform a comparatively large set of activities within the media streaming service 104, including establishing an account with the media streaming service 104 (involving receipt of the registration request by a front end server 102 and the establishment of the account on an account server 102); searching for interesting media objects 302 (involving the receipt of the query by a front end server 102, and the application of the query to the media objects 302 stored by a media server 102 configured to store media objects 302); purchasing license to a media object 302 (involving the receipt of the purchase request by a front end server 102, the initiation of a charge 304 for the license by a commerce server 102 for processing by a transaction server 102); and requesting to stream a particular media object 304 (involving the receipt of a request 316 by the front end server 102, verification with the account server 102 that the user 106 is entitled to stream the selected media object 302, and the initiation of the streaming by the media server 102). Moreover, respective activities may be transmitted to the device 108 of the user 106 along different network paths; e.g., the media streaming service 104 may utilize a first ISP 306 to issue web-based replies to web-based requests 316, but may utilize a second ISP 306 to handle the streaming of media objects 302 with consistently high performance characteristics), but may share other routes in the network path from the sources of the activities to the user 106 (e.g., using the same distance network 308, such as the backbone of the internet; the same local area network 310 of the user 106, and the same network adapter 312 in the device 108 operated by the user 106). Additional variations in the service paths of different activities involve the components of the device 108 of the user 106 invoked to fulfill the request 316 of the user 106, e.g., a display, a storage device, a codec 318, and a web browser 320 hosting a client 322 and a media player 324. It may be appreciated from a review of this exemplary scenario 300 that the service quality experienced by a user 106 may depend on the comparative performance of the set of components comprising the service path of the particular activity performed by the user 106. Moreover, it may be evident from this figure that even if the performance of a component that is relevant to many actions is measured as a service quality metric 118 (e.g., the network throughput rate between the first ISP 306 of the service 104 and the ISP 306 of the user 106), the service quality of the service 104 may be determined by many factors of this complex system other than the generalized service quality metric 118, which may occasionally be only a small determinant, and occasionally completely irrelevant, to the service quality experienced by users 106.

In the exemplary scenario 400 of FIG. 4, the service 104 is evaluated to identify a set of activities 402 that users 106 may perform within the service 104. For example, the activities 402 may include logging into the service 104; the purchasing of a license for a media object 302; and the streaming of a media object 306 to a device of the user 106. Moreover, for each activity 402, a service path 404 may be identified, comprising a set of segments 406 involved in providing the activity 402 from a source (e.g., a server 102 of the service 104) to the user 106. For example, for the activity 402 of logging into the service 104, a service path 404 may be identified comprising testing a set of login credentials, such as a username and password, and generating and sending to the user 106 an identifying cookie that may be stored by a web browser of the user 106 and presented with subsequent requests that involve authenticating the identity of the requester; and sending a response from a front end server 104 (through several segments 406 of the network) and through a local area network to a web client executing within a web browser on a device 108 of the user 106. For the activity 402 of purchasing a media object, a service path 404 may be identified of segments 406 comprising receiving a request for a particular type of license for a particular media object 302 or set of media objects 302; receiving a payment account; initiating a financial transaction with a transaction server; recording the successful transaction and the purchased license in an account of the user 106; and returning a response to the user 106 indicating the success or failure of the transaction, again utilizing several segments 406 of a network and a local area network to reach a web client executing within a web browser on a device 108 of the user 106. For the activity 402 of streaming a media object 302 to a device 108 of the user 106, a service path 404 may be identified having segments 406 comprising verifying that the account of the user 106 includes a license to the media object 302, and instructing a media server 102 to initiate the streaming of the media object 302 across the segments 406 of a network (including a second ISP 306) to a codec installed on the device 108 of the user 106, which may decode the media object 302 for rendering within a web browser player within a web browser.

In this manner, for each activity 402 in the exemplary scenario 400 of FIG. 4, a service path 404 is identified comprising the sequence of components from a source to the user 106, e.g., the sequence of components and interactions beginning with the receipt by the service 104 of the request to perform the activity 402, including the processing of the request by the service 104, the transmission of a result to the user 106, and the use of the result in the device 108 of the user 106. It may be appreciated that evaluations of the service quality of these activities 402 involving an evaluation of the service quality of the segments 406 of the detailed service path 404 may represent a fairly comprehensive evaluation of the potential causes of service quality determinants, and a much more detailed and relevant evaluation than may be achievable through the monitoring of generalized service quality metrics 118 (e.g., sustainable network throughput) that may apply (with varying degrees of significance) to many activities 402 of the service 104.

Having identified service paths 404 and segments 406 thereof for the respective activities 402 comprising the service 104, an embodiment may apply the techniques presented herein by measuring the service quality of the segments 406 of a service path 404 of an activity 402 performed by the user 106. For each segment 406 of the service path 404, a monitoring mechanism may be devised to detect and report a service quality metric 118 for the segment 406. For example, for segments 406 involving a task performed by a server 102 (including a server 102 that is not controlled by the service 104, such as a transaction server provided by a bank), the service quality metric 118 may be measured as the time involved in fulfilling the task, as well as the reliability of the server 102 in performing the task (vs. generating an error, a timeout, or an incorrect or incomplete result); for network segments under the control of the service 104, a bandwidth monitor may be implemented by the service 104 to detect the throughput rate; and for network segments not under the control of the service 104, such as the networking hardware of the user 106, the service 104 may provide to an administrator of the segment 406 a monitoring process (e.g., implemented in a software client provided to the user 106).

These monitors may generate service quality metrics 118 for respective segments 406 that may be utilized to identify the service quality of a service path 404 utilized during an activity 402 performed by a user 106 of the service 104. For respective activities 402 of the service 104, a service path 404 may be identified as a sequence of segments 406, and a service quality metric 118 may be measured for each segment 406 during one or more performances of the activity 402 by one or more users 106. Additionally, for each activity 402, an activity service quality metric 118 may be identified that represents the service quality of the activity 402, based on the service quality metrics 118 of the segments 406 of the service path 404 of the activity 402. For example, for an activity 402 of logging into the service 104, an embodiment may detect satisfactory service metrics 118 for many of the segments 406, and may therefore select a satisfactory service quality metric 118 for the activity 402; but for the activity 402 of purchasing a license for a media object 302, an embodiment may detect a poor service metric 118 for the segment 406 involving the processing of the charge by a transaction server (e.g., the server of the bank providing the payment form that the user 106 has submitted for payment for the purchase), and may identify a poor service quality metric 118 for the activity 402. In some such scenarios, the significance of the service quality metric 118 of a particular segment 406 may vary among activities 402 having service paths 404 including the segment 406 (e.g., the throughput of a particular network segment 406 may significantly impact the service quality of a streaming media activity 406 featuring a time-sensitive delivery of a large amount of data, but may have little impact on the service quality of a login activity 406 involving the transfer of a small amount of data on a non-time-sensitive schedule). Additionally, based on the service quality metrics 118 of the activities 402, a service quality metric 118 of the service 104 may be identified.

FIG. 5 presents an illustration of an exemplary scenario 500 featuring the application of these techniques to identify the service quality of a media service 104 based on the service quality metrics 118 for respective activities 402 of the service 104, which are in turn determined by the service quality metrics 118 of the respective segments 406 comprising the service path 404 of the activity 402. For example, for a first activity 402 comprising a login request, service quality metrics 118 may be measured for the segments 406 of the service path 404, including the performance of the servers 102 involved in the login request, the throughput of the network segments 404 relaying the response (including the ISPs 306 of the service 104 and the user 106), and the processing and rendering of the response within the web browser of the user 106. These service quality metrics 118 may be satisfactory except for a network segment 406 that may not significantly affect the perceived service quality of the activity 402 (e.g., resulting in a brief delay in the fulfillment of the login request), and accordingly, a satisfactory service quality metric 118 may be assigned to the activity 402. However, for a second activity 402 involving the purchase of a license for a media object 306, the service quality metrics 118 of respective segments 406 may be generally satisfactory, except for a fair service quality metric 118 identified for the network segment 406 involving the ISP 306 of the user 108 (which, again, may not be a significant determinant of the service quality of the activity 402) and a poor service quality metric 118 for the segment 406 comprising the process charge through the transaction server 102 (e.g., protracted transaction times resulting in timeout messages, a failure to respond, or incorrect denial of charges). This identification may result in the assignment to the activity 402 of a poor service quality metric 118, which may notify an administrator of the service 104 of the existence of a problem with the service quality of this activity 402, and may also inform the administrator as to the cause of the poor service quality and the significance of the service quality of this segment 406 to the overall service quality of the activity 402. As a third example, for the service path 404 of a streaming activity 402, the service quality metrics 118 of respective segments 406 may be generally satisfactory, except for a fair service quality metric 118 of two segments 118 (e.g., the ISP 306 of the user 106 and a network adapter of the device 108 operated by the user 106 to stream video to the media player). While the fair service quality metric 118 of the ISP 306 did not significantly impact the service quality metrics 118 of the other activities 402 (which were not particularly sensitive to brief network delays), the streaming activity 402 may be significantly affected by the performance of these segments 406; thus, the streaming activity 402 may be assigned a fair service quality metric 118. Additionally, based on the service quality metrics 118 of the activities 402, a service quality metric 118 may be identified for the service 104. In this manner, service quality metrics 118 may be identified for the segments 406 comprising the service paths 404 of respective activities 402, for respective activities 402, and for the service 104 in accordance with the techniques presented herein.

C. Exemplary Embodiments

Figure 6:
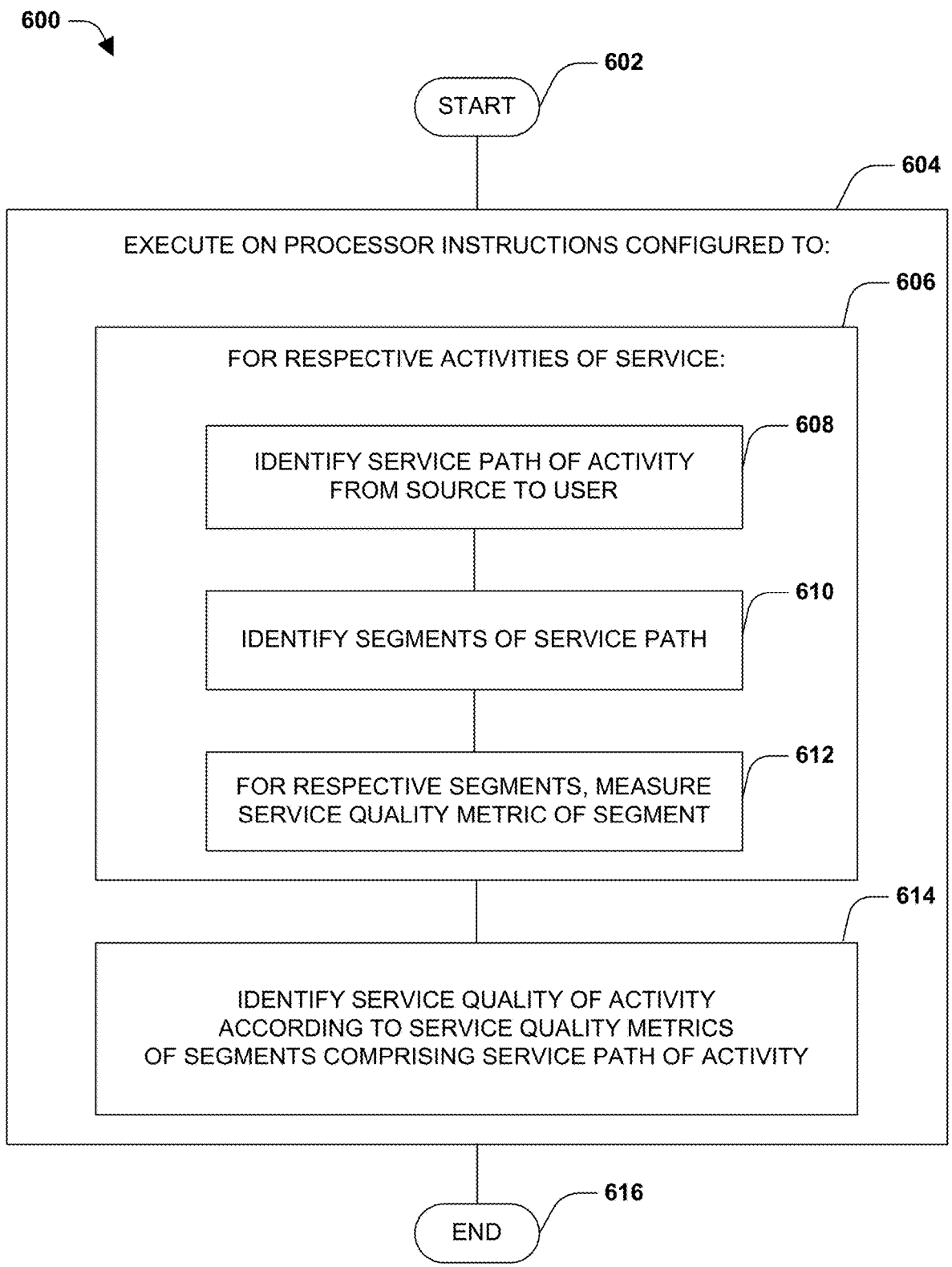
FIG. 6 is a flowchart illustrating an exemplary method of identifying a service quality of a service comprising activities provided by sources to users in accordance with the techniques presented herein.

FIG. 6 presents a first embodiment of the techniques presented herein, illustrated as an exemplary method 600 of identifying a service quality of a service 104 comprising activities 402 provided by sources to users 106. The exemplary method 600 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 600 begins at 602 and involves executing 604 the instructions on the processor. Specifically, the instructions are configured to, for respective 606 activities 402 of the service 104, identify 608 a service path 404 of the activity 402 from the source to the user 106, and identify 610 at least two segments 406 in the service path 404. The instructions are also configured to, for respective 606 segments 406 of the service path 404 of respective services 402, measure 612 a service quality metric 118 of the activity 402 provided along the segment 406. The instructions are al configured to identify 614 the service quality of the activity 402 of the service 104 according to the service quality metrics 108 of the segments 406 of the service path 404 of the activity 402. In this manner, the exemplary method 600 achieves the identification of the service quality of the service 104 based on the service quality metrics 118 of the activities 402 comprising the service 104, and so ends at 616.

Figure 7:
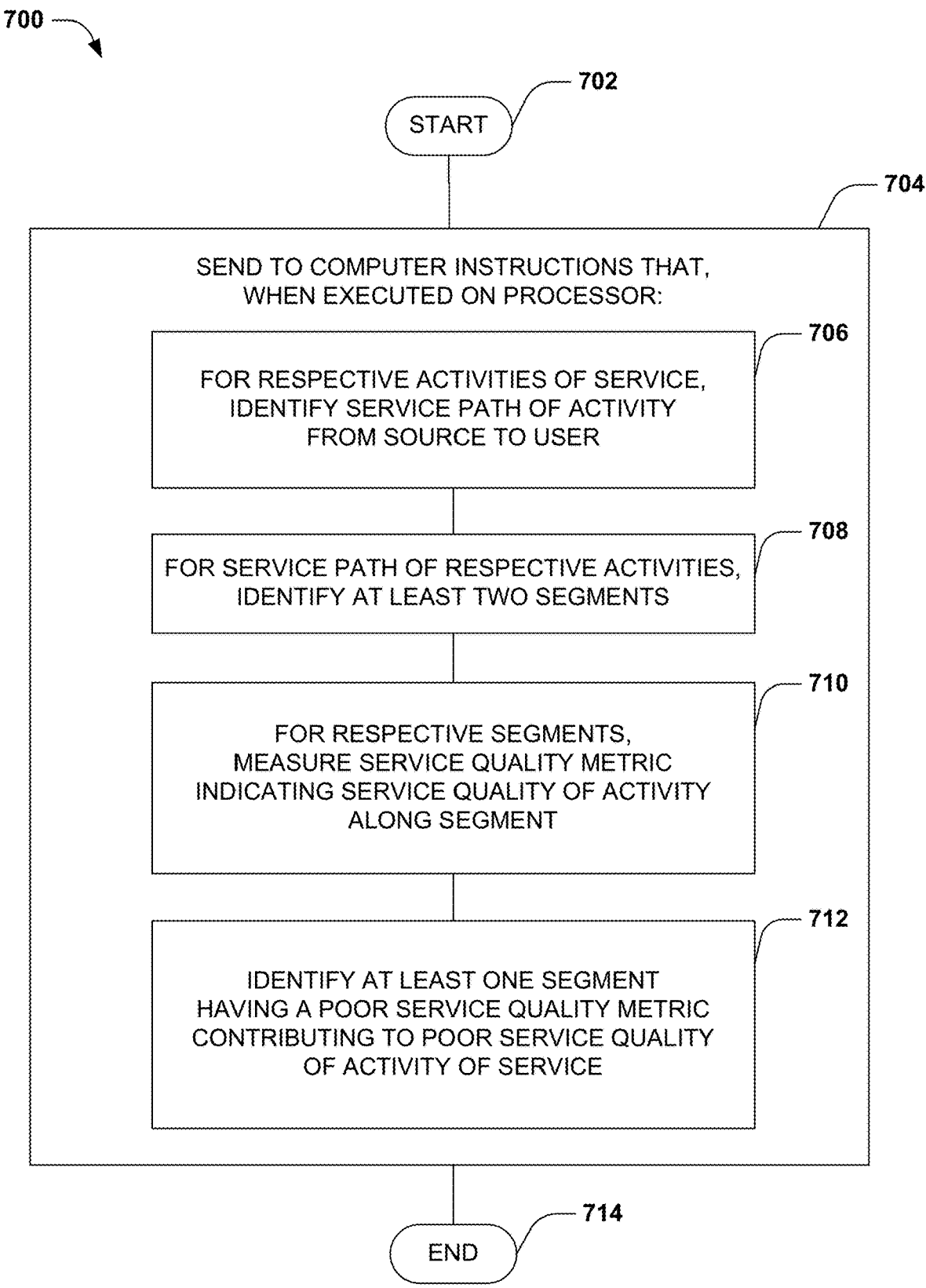
FIG. 7 is a flowchart illustrating an exemplary method of diagnosing poor service quality of a service provided by sources to users in accordance with the techniques presented herein.

FIG. 7 presents a second embodiment of the techniques presented herein, illustrated as an exemplary method 700 of diagnosing poor service quality of a service 104 provided by sources to users 106. The exemplary method 700 may be implemented, e.g., as a set of instructions stored in a memory component of a device (e.g., a memory circuit, a platter of a hard disk drive, a solid-state memory component, or a magnetic or optical disc) that, when executed by a processor of a device, cause the device to perform the techniques presented herein. The exemplary method 700 begins at 702 and involves sending 704 to the computer instructions that, when executed on the processor, cause the device 104 to perform the techniques presented herein. Specifically, the instructions are configured to, for respective 706 activities 402 of the service 104, identify 708 a service path 404 of the activity 402 from the source to the users 106, and for the service paths 404 of respective activities 402, identify 710 at least two segments 406. The instructions are also configured to, for respective segments 406, measure 710 a service quality metric 118 indicating the service quality of the activity 402 provided along the segment 406. The instructions are also configured to identify 712 at least one segment 406 having a poor service quality metric 118 contributing to the poor service quality of the activities 402 of the service 104. In this manner, the exemplary method 700 achieves the diagnosis of the poor service quality of the service, and so ends at 714.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 8:
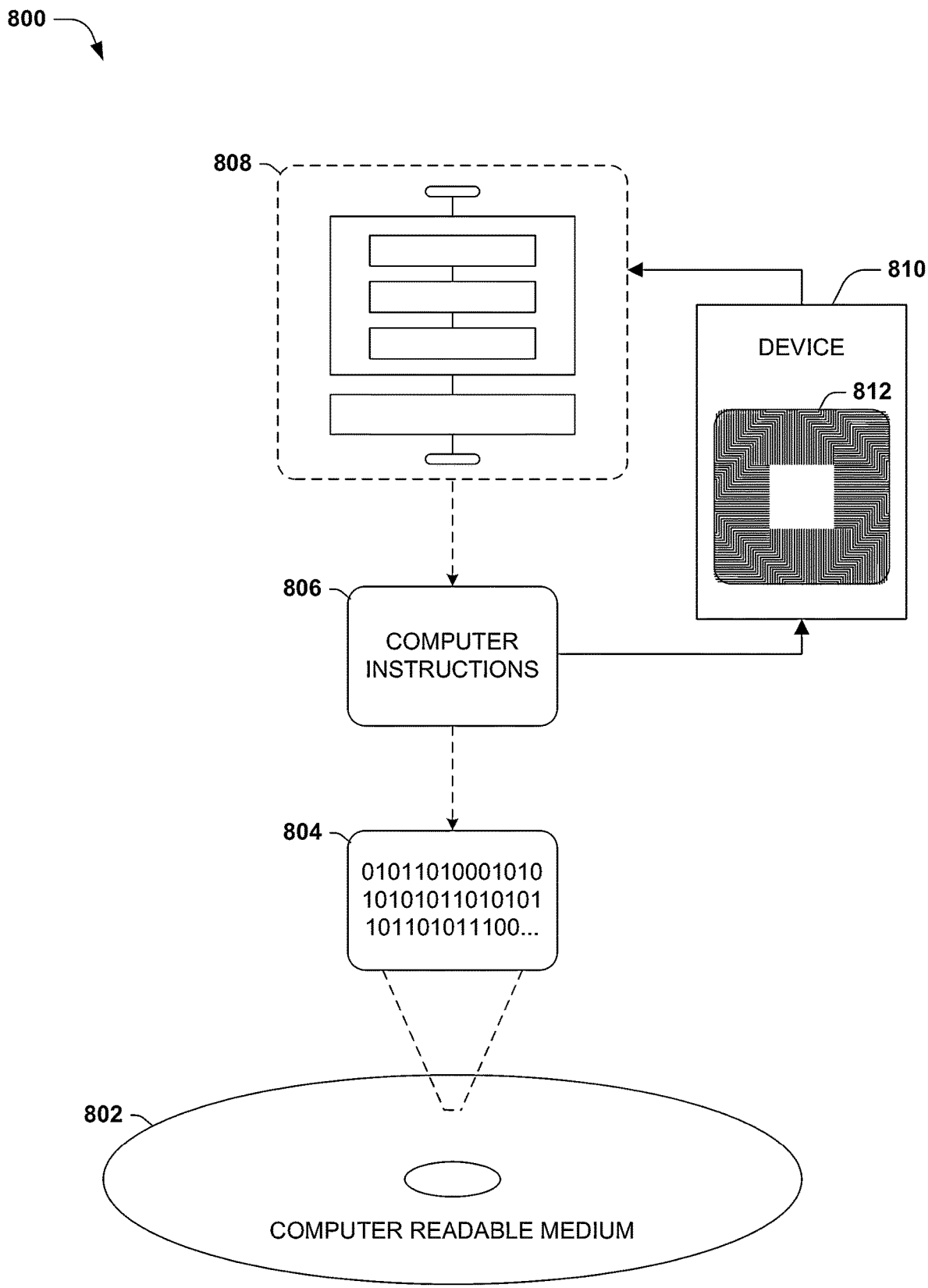
FIG. 8 is an illustration of an exemplary computer-readable medium comprising processor-executable instructions configured to embody one or more of the provisions set forth herein.

An exemplary computer-readable medium that may be devised in these ways is illustrated in FIG. 8, wherein the implementation 800 comprises a computer-readable medium 802 (e.g., a CD-R, DVD-R, or a platter of a hard disk drive), on which is encoded computer-readable data 804. This computer-readable data 804 in turn comprises a set of computer instructions 806 configured to operate according to the principles set forth herein. In one such embodiment, the processor-executable instructions 806 may be configured in such a manner that, when executed on a processor 812 of a device 810, cause the device to identify a service quality of a service comprising activities provided by sources to users, such as in the exemplary method 600 of FIG. 6. In another such embodiment, the processor-executable instructions 806 may be configured in such a manner that, when executed on a processor 812 of a device 810, cause the device to diagnose the poor service quality of a service 104 provided to a set of users 106, such as in the exemplary method 700 of FIG. 7. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

D. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 600 of FIG. 6 and the exemplary method 700 of FIG. 7) to confer individual and/or synergistic advantages upon such embodiments.

D1. Scenarios

A first aspect that may vary among embodiments of these techniques relates to the scenarios wherein such techniques may be utilized. As a first variation of this first aspect, these scenarios may be used to monitor many types of services 104, such as communication services (e.g., email hosting, and chat using audio, video, text, or other communication types, which may be instant or cached, and which may be one-to-one, conferencing, or one-to-many such as in a broadcast); media services (e.g., streaming audio, video, still image, and/or text sharing or broadcasting); information services (e.g., general or personalized news distribution); web service; and services for creating, hosting, sharing, and/or selling files, images, documents, applications, etc. These services 104 may also be provided in many business forms (e.g., free, advertising-sponsored, and/or subscription), and may be organized in a server/client and/or peer-to-peer manner. As a second variation of this first aspect, the services 104 may be accessed by many types of users 106, including individuals, groups, organizations, and automated agents (e.g., web services 106). As a third variation of this first aspect, the service 104 may involve many types of activities 402, including activities 402 requested or initiated by a user 106; activities 402 requested or initiated by a server 102 or administrator; and activities 402 requested or initiated by a third party. Those of ordinary skill in the art may devise many scenarios in which the techniques presented herein may be advantageously utilized.

D2. Identifying Activities, Service Paths, and Segments

A second aspect that may vary among embodiments of these techniques relates to the selection of service paths 404 and/or segments 406 for respective activities 402. As a first variation of this second aspect, the activities 402 of the service 104 may be identified by a human, such as an administrator or user of the service 104, or may be automatically detected (e.g., from the menu options of a website for the service 104, from the methods of a web service 104, or from the methods of a programming interface through which the service 104 may be invoked). The activities 402 may also be selected at different levels of granularity; e.g., an activity 402 may be selected as a single interaction of a user 106 with the service 104, or as a set of interactions that a user 106 may undertake to perform a particular task.

As a second variation of this second aspect, the service path 404 of the service 102 may comprise many types of segments 406, including one or more operations performed by one or more devices (such as a server 102), processes, and/or humans, or an interface between two or more devices, processes, and/or humans. For example, the segments 406 may be selected from a segment type set comprising a server data center segment type (e.g., an operation performed by a server 102 operating at a data center associated with the service 104); an infrastructural network segment type (e.g., a transmission of data within the infrastructure of the service 104, such as within the local area network of the service 104); a local carrier network segment type (e.g., the ISP 306 of the service 104 or the user 106); a user network segment type (e.g., the local area network of the user 106); and a user client segment type (e.g., operations performed by a software client utilized by the user 106 to access the service 104). Particular examples of segments 406 include a data transaction performed by a server 102; a query performed by a server 102; a generation of a web page by a server 102; a transmission of a data set within a wired or wireless network; and a rendering of a web page by a web browser of a device 108. Moreover, the segments 406 of the service path 404 may be identified with varying levels of granularity. As another example, for an activity 402 involving a transmission of data from the source to the user 106, the service path 404 may comprise one segment 406 representing the transmission of data from the source to the user 106, or may comprise several segments 406 for respective links in the transmission of the data (e.g., one segment 406 for each node in the network path of the transmission, or for each link between two nodes in the network path). For example, if the activity 402 involves a transmission of data using at least one segment 406 of a network segment type that spans two or more locations, the segment 406 may be further segmented into network location segments that respectively represent the locations spanned by the segment 406.

As a third variation of this second aspect, the segments 406 of a service path 404 may be identified by a human (e.g., an analyst), or may be identified by an automated process. Moreover, a human and/or automated process may adjust the segments 406 of the service path 404. For example, a segment 406 may comprise several components that may have been selected together as a segment 406 (e.g., a network segment comprising two or more network links; a segment 406 comprising a task performed by two or more interoperating devices (such as servers 102) or processes; or a segment 406 comprising a task comprising two or more subtasks). However, the segment 406 may be identified as causing poor service quality that is difficult to diagnose in view of the aggregation of the components. Therefore, the segment 406 may be decomposed into segments of finer granularity for the respective components. For example, for each component, an embodiment of these techniques may identify a component path for the component from the source of the component to the user 106; identify segments 406 comprising respective component paths; measure a segment service quality metric of respective segments comprising the component path; identify a component quality of the component according to the segment service quality metric of the segments of the component path; and identify the service quality of a segment 406 within the service path 404 of an activity 402 according to the component quality metrics of the segments 406 comprising the component path of the component of the segment 406. Those of ordinary skill in the art may devise many techniques for identifying the service paths 404 and segments 406 thereof for respective activities 402 of a service 104 while implementing the techniques presented herein.

D3. Types and Detection of Service Quality Metrics

A third aspect that may vary among embodiments relates to the selection and detection of service quality metrics 118 for respective segments 406 of the service paths 404 of the activities 402 of a service 104. As a first variation of this third aspect, many types of service quality metrics 118 may be generated for respective segments 406 of the service path 404 of an activity 402. For example, for a segment 406 comprising a network connection, the service quality metrics 118 may include measurements of unidirectional or bidirectional throughput rate, latency, consistency, reliability, error-free transmission, and prioritization of data (e.g., the capability to prioritize a queue of data transmissions according to time sensitivity). For a segment 406 comprising a task performed by a device or process, the service quality metrics 118 may include measurements of the duration of the task, the computing resources utilized in the fulfillment of the task (which may relate to the scalability of the task to handle a greater volume of concurrent activities 402), the consistency and reliability of the results of the task, and the quality of data generated by the task (e.g., the resolution and/or framerate of a stream of a media object 302 streamed by a streaming media server).

As a second variation of this third aspect, the service quality metrics 118 may be received from many data sources. As a first example of this second variation, where the service 104 is provided by one or more servers 102, service quality metrics 118 may be measured by installing on at least one server 102 a service quality measuring client that is configured to measure service quality metrics 118 of one or more segments 406 of the service paths 404 of the activities 402, and receiving from the service quality measuring client at least one service quality metric 118 of at least one segment 406 detected during uses of activities 402 having service paths 404 including the segment 406. As a second example of this second variation, for an activity 402 accessed by a user 106 through a device 108, service quality metrics 118 may be measured by installing on the device 108 a service quality measuring client configured to measure service quality metrics of the segments 406 of the service paths 404 of the activities 402, and receiving from the service quality measuring client at least one service quality metric 118 of at least one segment 406 detected during uses of activities 402 having service paths 404 including the segment 406. As a third example of this second variation, where at least one segment 406 of at least one service path 404 of at least one activity 404 is provided by a service provider (e.g., a network segment provided by an ISP 306), the service quality metrics 118 may be measured by receiving from the service provider service quality metrics 118 of the segment 406 detected during uses of activities 402 having service paths 404 including the segment 406. As a fourth example of this second variation, where the service 104 is accessible to an activity simulating service (e.g., an application monitoring service that simulates the invocation of activities 402 by simulated users 106 and reports performance results of the service 104), service quality metrics 118 may be measured by enabling the activity simulating service to generate simulated uses of the activities 402 of the service 108 (e.g., granting a user account to the activity simulating service) and receiving from the activity simulating service service quality metrics 118 of the segment 406 detected during simulated uses of the activities 402 having service paths 404 including the segment 406. As a fifth example of this second variation, where the activity 402 is accessed by users 106, service quality metrics 118 may be measured by receiving from users 106 service quality metrics 118 for respective activities 402 of the service 104 exhibited by the users 106 while using the activities 402, and applying the service quality metrics 118 to the segments 406 of the service paths 404 utilized to provide the activities 402 to the users 106. Additionally, service quality metrics 118 may be received from several of these sources, and may be synthesized to generate service quality metrics 406 detected from a variety of sources that may be highly diagnostic of the service quality of the segments 406.

As a third variation of this third aspect, the service quality metrics 118 of respective segments 406 may be detected and/or reported for particular service paths 404, activities 402, services 104, and/or users 106. It may be appreciated that segments 406 may exhibit different levels of performance in different circumstances (e.g., a network link may capably transmit a steady stream comprising a large data at a consistently high throughput rate, but may have difficulty transmitting an intermittent stream for a set of small data sets). As a third example of this sixth variation, the service quality metrics 118 may be detected during an actual, simulated, and/or hypothetical performance of the activity 402, and may be detected and/or reported at different levels of granularity or frequency. As a fourth example of this sixth variation, the service quality metrics 118 may be measured by an automated process or device (e.g., a monitoring device or process may be utilized by the service 104 to monitor components managed by the service 104; may be provided users 106 to monitor components managed by the user 106; or may be utilized by the service 104 or an outside agency to monitor intermediate segments 406 that are not managed by either the service 104 or a user 106, such as segments 406 of a network backbone). As a fifth example of this sixth variation, the service quality metrics 118 may be reported quantitatively; may be calculated or estimated from other data; may be reported qualitatively and translated into a quantitative metric; and/or may be selected by a human (e.g., a user 106 or an administrator of the service 104) based on the perceived service quality of the segment 406.

As a fourth variation of this third aspect, the association of activities 402 with segments 406 comprising the service path 404 whereby an activity 402 is performed may be achieved in many ways. In some scenarios, a particular activity 402 may be performed through one of several service paths 404. For example, a media object 302 may be streamed from a media server 102 to a user 106 along several network routes having different network performance characteristics; or a user 106 may request to perform a particular activity 402 on one of several available servers 102 that have different server performance characteristics. In other scenarios, the service path 404 of an activity 402 may not be prospectively unpredictable or retrospectively indeterminate; e.g., a large number of components may be available to serve as a segment 406 in a service path 404 (e.g., a large number of network routes that a network transmission may take or have taken, or a large number of servers 104 in a server farm whereupon a task may be or have been performed). In such scenarios, a variable aspect of the service 104 may be represented and measured as a single segment 406 representing several options of the aspect, and/or as different segments 406 comprising different service paths 404 along which the activity 402 may be performed. As a first example, if a server 102 may stream a media object 302 through one of two available ISPs 306, different service quality metrics 118 may be recorded for each segment 406, and comparative information on the service quality of the activity 402 achieved through the use of each segment 406 may be generated and presented. As a second example, both servers 102 may be represented as a single segment 406, and may collect and average the service quality metrics 118 during the use of either ISP 306. As a third example, activities 402 and/or segments 406 may record an association when a segment 406 is invoked in a service path 404 of an activity 402. For example, respective activities 402 may be associated with an activity identifier (e.g., an integer that distinctively identifying the activity 402, such as a media object streaming activity, or an instance of the activity 402, such as the streaming of a particular media object 302 to a particular user 106), and an embodiment may be configured to, upon using a segment 406 of a service path 404 to provide an activity 402, associate the activity identifier of the activity 402 with the segment 406. Alternatively or additionally, respective segments 406 may be associated with a segment identifier, and an embodiment may be configured to, upon using a segment 406 of a service path 404 to provide an activity 402, associate the segment identifier of the segment 406 with the activity 402. The identification of segments 406 for respective activities 402 may thereafter be identified according to the associations of segment identifiers and/or activity identifiers with segments 406 and activities 402. Those of ordinary skill in the art may identify many types of service quality metrics 118 and ways of detecting the service quality metrics 118 for the segments 406 of the service paths 404 of the activities 402 of the service 104 in accordance with the techniques presented herein.

D4. Uses of Service Quality Metrics

A fourth aspect that may vary among embodiments relates to the evaluation of the service quality metrics 118 to evaluate the service quality of the activities 402 and the service 104. As a first variation of this fourth aspect, a service quality metric 118 of an activity 402 may be identified in different ways based on the service quality metrics 118 of the segments 406 of the activity 402. For example, the service quality metrics 118 of the segments 406 may simply be mathematically averaged to generate the service quality metric 118 of an activity 402. Alternatively, the service quality metrics 118 of different segments 406 may be attributed a different segment weight; e.g., the perception of service quality of an activity 402 may be more heavily determined by the service quality of one segment 406 of the service path 404 than another segment 406. For example, the service quality (measured as throughput rate) of a network segment 404 may significantly affect the service quality of an activity 402 involving the streaming of media objects 302 (because users 106 may be highly sensitive to pauses or changes in framerate of a streamed media object 302), but may have little effect on the service quality of activities 402 involving web requests and responses (for which users 106 may have low expectations of rapid responsiveness). The weights may be identified via a static formula, or may be dynamically adjusted by an administrator of the service 104 or a process (e.g., a learning algorithm that identifies the comparative significance of the service quality of respective segments 406 to the service quality of the activity 402 perceived by users 106).

As a second variation of this fourth aspect, the effects of service quality exhibited by respective segments 406 may be identified using the service quality metrics 118. As a first such example, a bottom-up approach may be utilized, wherein segments 406 having unsatisfactory service quality metrics 118 may be identified, and the activities 402 using service paths 404 including the unsatisfactorily performing segments 406 may be identified as possibly exhibiting reduced service quality. As a second such example, a top-down approach may be utilized, wherein activities 402 exhibiting unsatisfactory service quality may be identified, and additional scrutiny (including the measurement of more detailed and/or more frequent service quality metrics 118) may be applied to the segments 406 comprising the service paths 404 of the activity 402 to identify the segments 406 contributing to the unsatisfactory service quality of the activity 402.

As a third variation of this fourth aspect, the effects of service quality exhibited by respective segment may enable the identification of dependencies within the segments 406 of the service 104. For example, a complex service 104 may comprise a large and varied set of segments 406, and it may be difficult to determine dependencies among the segments 406 through direct examination. However, such dependencies may be identified through observations of correlated service quality metrics 118. For example, a first segment 406 exhibiting a poor service quality metric 118 may be identified as having a unidirectional or bidirectional dependency with a second segment 406 exhibiting a coincidentally poor service quality metric 118 (e.g., observations of coincidental fluctuations in the service quality metrics 118 of the segments 406). Additionally, evaluations of such fluctuations may indicate the weight of the dependency (e.g., the degree to which changes in the service quality of a first segment 406 affect a dependent segment 406). Conversely, identified dependencies may be utilized to determine the cause of a particular service quality metric 118 exhibited by a segment 406; e.g., a segment 406 exhibiting poor service quality may be known to depend on another segment 406 of the service path 404 that is also exhibiting poor service quality, and that may be contributing to the diminished service quality of the first segment 406.

As a fourth variation of this fourth aspect, the service quality metrics 118 may be used to adjust the configuration of the service 104 in an automated manner in order to improve the service quality of the activities 402. As a first example, an embodiment may be configured to detect a poorly performing segment 406 and to ameliorate the poor service quality. To this end, the embodiment may, for respective segments 406, identify a service quality metric threshold (e.g., for a network segment, a minimum acceptable throughput rate; or for a server segment, a maximum amount of time for processing a particular task), identify segments 406 exhibiting a poor service quality metric 118 below the service quality metric threshold of the segment 406, and repair, circumvent, compensate for, or replace the identified segment 406. As a second example, an embodiment of these techniques may endeavor to improve the service quality of a service 104 by choosing an allocation of a set of resources to respective segments 406 (e.g., more powerful or plentiful allocation of processor time to various processes, or prioritization of bandwidth through a network component to various activities 402). To this end, the embodiment may examine the service quality metrics 118 of respective segments 406, identify segments 406 having poor service quality metrics 118, and allocate additional resources to such segments 406 in order to improve the service quality metrics 118. Additionally, the embodiment may utilize a valuation algorithm to predict the magnitude of the improvement in the service quality metrics 118 of the segment 406 that is achievable by allocating greater resources and the cost of the deployed resources, and hence the marginal or comparative value proposition in allocating a first allocation of resources to this segment 406 as compared with a second allocation of resource to this segment 406 or another segment 406, and may choose the allocation of resources across the segments 406 predicted to achieve the highest overall improvement in the service quality of the service 104. As a third example, if an activity 402 may be provided to users 106 using two or more service paths 404, an embodiment may evaluate the service quality metrics 118 of the segments 406 of each service path 404, and may configure the activity 402 to utilize the service paths 404 comprising the segments 406 having the highest segment quality metrics 118. As a fourth example, the service quality metrics 118 may be evaluated to identify changed and trends in the service quality exhibited by respective segments 406, service paths 404, activities 402, and/or the service 104. For example, upon measuring a first service quality metric 118 of a segment 406, an embodiment may be configured to store the first service quality metric 118 as a historical segment quality metric of the segment 406; and upon measuring a second service quality metric 118 of the segment 406 at a subsequent time, the embodiment may compare the second service quality metric 118 of the segment 406 with historical service quality metrics 118 of the segment 118 to identify a segment quality change in the segment quality metrics 118 of the segment 406. This identification may be used, e.g., as an indicator of trends that may lead to changes in the service quality of the service 104.

As a fifth variation of this fourth aspect, the service quality metrics 118 may be utilized to notify and advise administrators and/or users 106 of the service 106 regarding the service quality of the service 104, the activities 402, the service paths 406, and/or the segments 408. As a first such example, an embodiment may, upon identifying a segment 406 exhibiting a poor service quality metric 118, alert an administrator of the service 104 of the poor service quality metric 118 of the identified segment 406. Alternatively or additionally, the embodiment may notify one or more users 106 of the poor service quality metric 118 of the segment 206, particularly if the segment 206 is under the control of the user 106 (e.g., a detection of a poor service quality metric 118 of a network adapter or a router in the local area network utilized by the user 118 to perform the activities 402 of the service 104).

Figure 9:
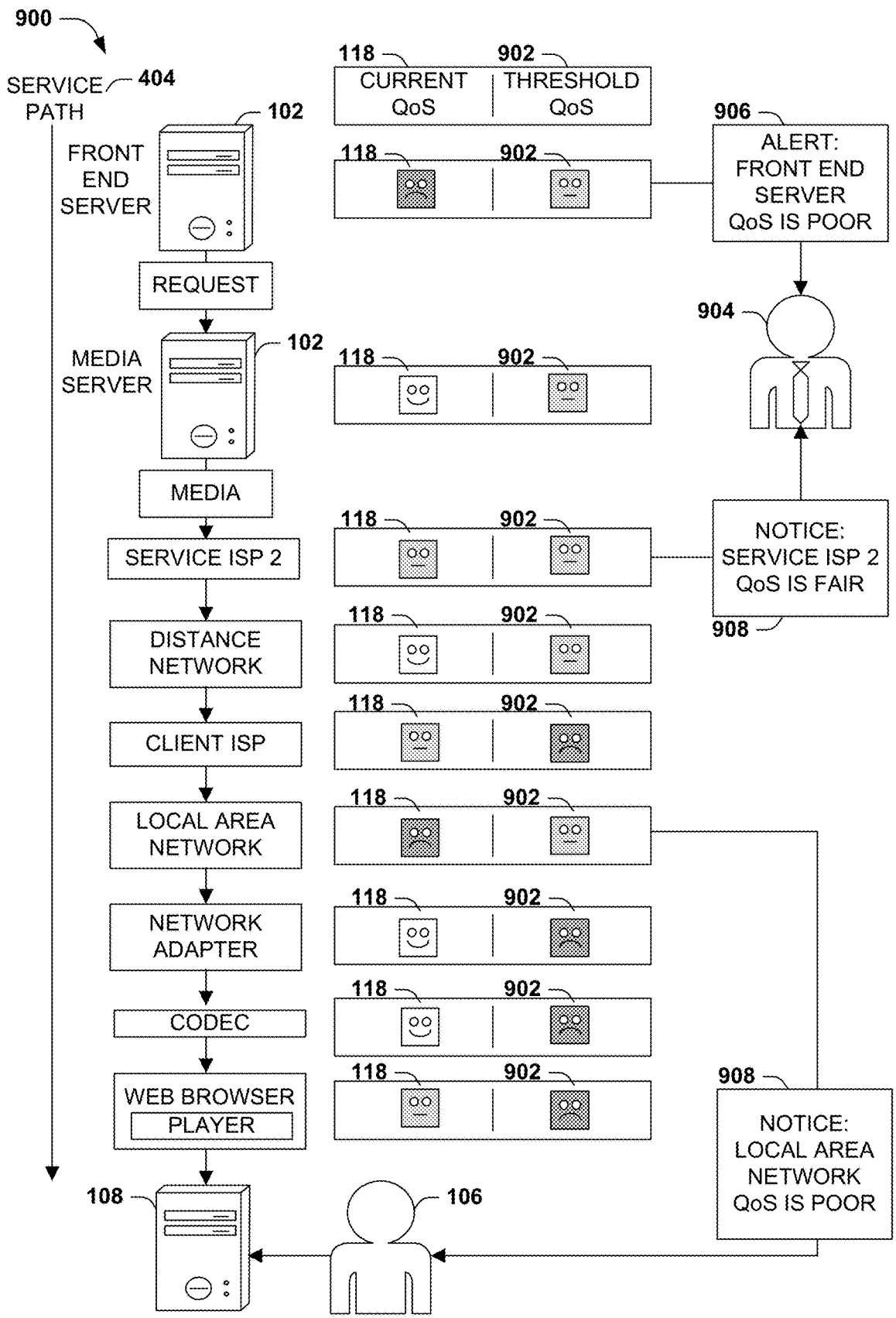
FIG. 9 is an illustration of an exemplary scenario featuring a comparison of service quality metrics with service quality thresholds for respective segments of the service path of an activity of a service in accordance with the techniques presented herein.

FIG. 9 presents an illustration of an exemplary scenario 900 featuring the generation of alerts based on the identification of segments 406 having an unsatisfactory service quality metric 118. In this exemplary scenario 900, a media streaming activity 402 of a media streaming service 104 is performed on behalf of a user 106 along a service path 404, e.g., a sequence of segments 406 comprising servers 102 network segments and hardware. The service quality of the service 104 is monitored on behalf of an administrator 904 of the service 104. For respective segments 406, a service quality metric may be detected 118, and may be compared with a service quality metric threshold 902 assigned to the segment 406 (e.g., a minimally acceptable service quality metric 118 for the segment 406). If a segment 406 under the control of the administrator 904 exhibits a service quality metric 118 below the service quality metric threshold 902 of the segment 406, an alert 906 may be generated and presented to the administrator 904. Additionally, notices 906 may be presented to the administrator 904 for segments 406 exhibiting service quality metrics 118 that are not below, but are close to, the service quality metric threshold 902 for the segment 406, e.g., as a warning or indication of a negative trend in the service quality of the segment 406, and possibly extending to the service quality of activities 402 having a service path 404 including the segment 406 and the service quality of the service 104. As another example, if a segment 406 under the control of the user 106 (e.g., the networking hardware of the ISP 306 of the user 106, the local area network of the user 106, or the web browser operating in the device 108 of the user 106) exhibits a service quality metric 118 below the service quality metric threshold 902 of the segment 406, a notice 908 may be generated and presented to the user 106 in order to advise the user 106 of the cause of a perception of poor service quality of an activity 402 and/or the service 104, and of techniques to improve the service quality. Additionally, a notice 908 of the poor service quality metric 118 of the user-controlled segment 406 may be sent to the administrator 904, e.g., to inform the administrator 904 of incompatibilities of the service 104 with particular hardware or software components, or to inform the efforts of the administrator 904 to reconfigure the service 104 to ameliorate the poor service quality on behalf of the user 118. In this manner, an embodiment may use the detected service quality metrics 118 to inform users 106 and administrators 904 of the causes of the service quality of the service 104.

As a sixth variation of this fourth aspect, the service quality metrics 118 of respective segments 406 may be utilized to identify the impact of a change in service quality on the users 106 of the service 104. As a first example, among a set of users 106, an activity 402 of the service 104 may be provided to different users 106 along different service paths 404 (e.g., different selections of network segments 406 to deliver a result of the service 104, such as a streaming media object 302, to users 106 in different geographic areas). Accordingly, when a poor service quality metric 118 is detected for a segment 406, the impact on the users 106 of the service 104 may be identified, e.g., by identifying the users 106 performing an activity 402 along a service path 404 including the segment 406. The embodiment may use this information to notify an administrator 904 of the effect of the diminished service quality on the users 106 of the service 104, and/or to prioritize the amelioration of the poor service quality of the segment 406 (e.g., assigning higher priority to addressing poor service quality metrics 118 of segments 406 affecting greater number of users 106). Alternatively or additionally, the embodiment may use this information to notify the users 106 of the service 104 who are affected by the poor service quality of the segment 406, e.g., by sending affected users 106 an email message acknowledging the awareness of the administrators 904 of the service 104 of the diminished service quality of the service 104, and/or identifying to the affected users 106 the segment 406 exhibiting poor service quality, in order to enable the users 106 to access the service 104 through a different service path 404 not including the poorly performing segment 406). As another example, the embodiment may use this information to detect or predict a user response of the users 106 of activities 402 including the segment 406 exhibiting the poor service quality metrics 118, who may be experiencing poor service quality of the activities 402 and/or service 104. For example, the embodiment may predict a degree of user frustration based on the magnitude and nature of the poor service quality metric 118, the type of segment 406, and/or the significance of the segment 406 in the activities 402 performed by the users 106, as well as a user response, such as a number of lost customers who are predicted to abandon the service 104 due to the poor service quality of the service 104 caused by the poor service quality metrics 118 of the segment 406, or a lost revenue resulting from the poor service quality of the segment 406 (e.g., a number of lost sales due to diminished service quality of a commerce server 102). This information may assist the administrator 904 in prioritizing and deploying resources to address diminished service quality of respective segments 406 in furtherance of the service quality of the service 104.

Figure 10:
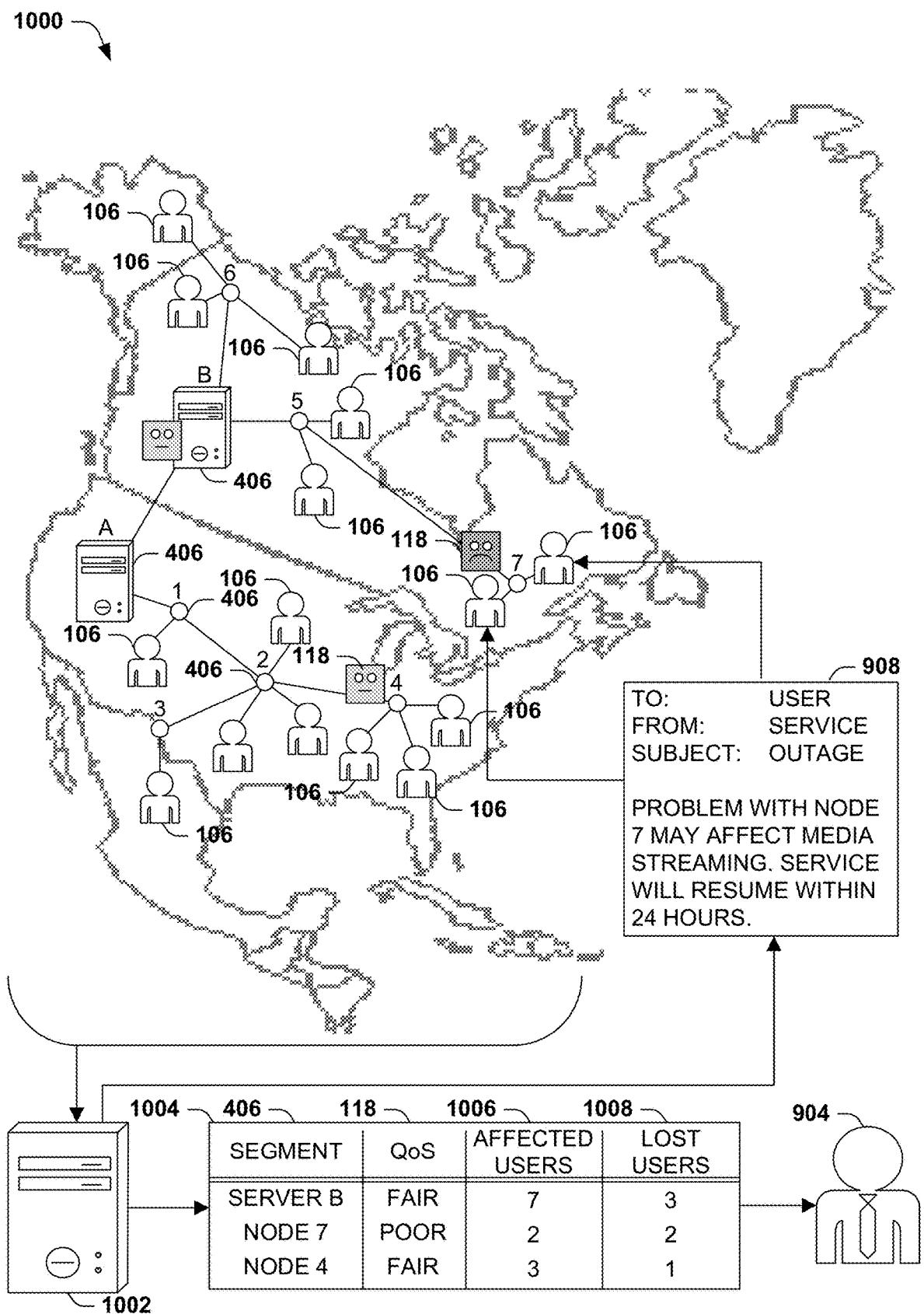
FIG. 10 is an illustration of exemplary uses of service quality metrics of respective segments of the service paths for respective activities of a service in accordance with the techniques presented herein.

FIG. 10 presents an illustration of an exemplary scenario 1000 featuring some uses of service quality metrics 118 detected for the segments 406 comprising the service paths 404 of the activities 402 of a service 104. In this exemplary scenario 1000, a service 104 is provided to a geographically distributed set of users 106, and is monitored by an administrator 904. (In this exemplary scenario 1000, the segments 406 comprise server segments 406 identified with letters and network segments 406 identified with numbers.) In accordance with these techniques, service quality metrics 118 may be detected for respective segments 406 comprising the service paths 404 of the activities 402 of the service 104. An embodiment of these techniques (e.g., a service monitoring server 1002) may be configured to receive the service quality metrics 118, and therefore may be notified when a fair service quality metric 118 is detected for a first segment 406 (e.g., network node 4) and a second segment 406 (e.g., server B), as well as a poor service quality metric 118 detected for a third segment 406 (e.g., network node 7). The service monitoring server 1002 may use this information in various ways. As a first example, the service monitoring server 1002 may identify and count the users 106 affected by the unsatisfactory service quality metrics 118 (e.g., users 106 performing activities 402 through a service path 404 including the segments 406 exhibiting the unsatisfactory service quality metrics 118). As a second example, the service monitoring server 1002 may detect or predict the user reaction of the users 106 affected by the unsatisfactory service quality metrics 118 (e.g., whether users 106 may express frustration with the service 104, diminish their usage of the service 104, or abandon the service 104). As a third example, the service monitoring server 1002 may generate and send to an administrator 904 a report 1004 of service tasks for the unsatisfactorily performing segments 406, including the number of affected users 108 and/or the predicted user response to the poor service quality, and may rank the service tasks according to priority (e.g., sorting the service tasks according to the effect of the poorly performing segments 406 on the users 106 of the service 104), thereby enabling the administrator 904 to allocate service quality resources in an efficient manner. As a fourth example, the service monitoring server 1002 may generate and send to the users 106 affected by the unsatisfactorily performing segments 406 a notice 908 indicating the existence of a service quality problem, identifying the poorly performing segment 406, acknowledging the awareness of the administrator 906 of the diminished service quality, and/or predicting the amount of time involved in ameliorating the service quality problem. The service monitoring server 1002 may use the service quality metrics 118 of the segments 406 in these and other ways to notify the users 106 and administrators 904 of the service 104 as to the current state of the service 104. Those of ordinary skill in the art may devise many uses of the service quality metrics 118 of the segments 406 in accordance with the techniques presented herein.

E. Computing Environment

Figure 11:
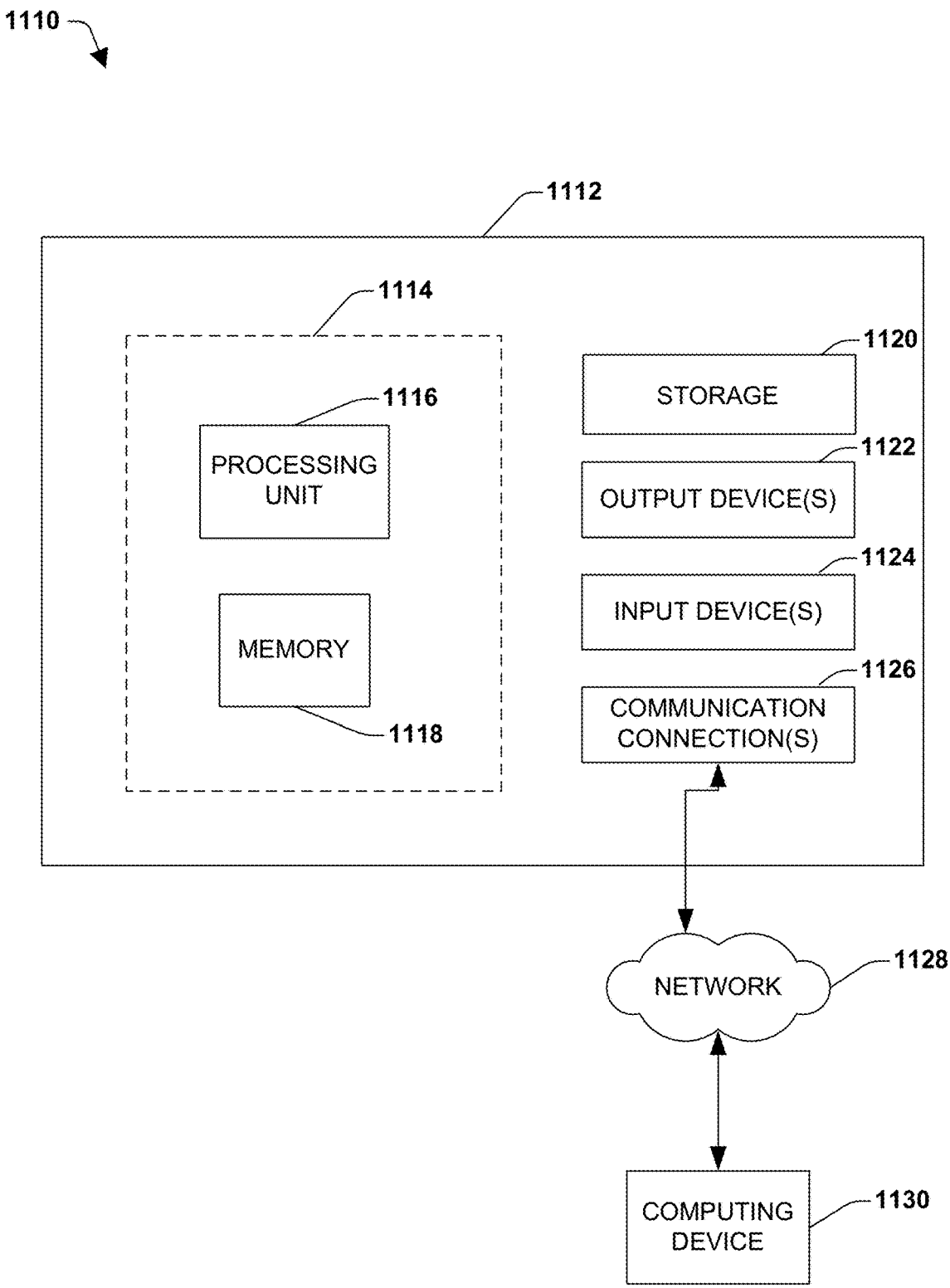
FIG. 11 illustrates an exemplary computing environment wherein one or more of the provisions set forth herein may be implemented.

FIG. 11 presents an illustration of an exemplary computing environment within a computing device 1102 wherein the techniques presented herein may be implemented. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, and distributed computing environments that include any of the above systems or devices.

FIG. 11 illustrates an example of a system 1100 comprising a computing device 1102 configured to implement one or more embodiments provided herein. In one configuration, the computing device 1102 includes at least one processor 1106 and at least one memory component 1108. Depending on the exact configuration and type of computing device, the memory component 1108 may be volatile (such as RAM, for example), non-volatile (such as ROM, flash memory, etc., for example) or an intermediate or hybrid type of memory component. This configuration is illustrated in FIG. 11 by dashed line 1104.

In some embodiments, device 1102 may include additional features and/or functionality. For example, device 1102 may include one or more additional storage components 1110, including, but not limited to, a hard disk drive, a solid-state storage device, and/or other removable or non-removable magnetic or optical media. In one embodiment, computer-readable and processor-executable instructions implementing one or more embodiments provided herein are stored in the storage component 1110. The storage component 1110 may also store other data objects, such as components of an operating system, executable binaries comprising one or more applications, programming libraries (e.g., application programming interfaces (APIs), media objects, and documentation. The computer-readable instructions may be loaded in the memory component 1108 for execution by the processor 1106.

The computing device 1102 may also include one or more communication components 1116 that allows the computing device 1102 to communicate with other devices. The one or more communication components 1116 may comprise (e.g.) a modem, a Network Interface Card (NIC), a radiofrequency transmitter/receiver, an infrared port, and a universal serial bus (USB) USB connection. Such communication components 1116 may comprise a wired connection (connecting to a network through a physical cord, cable, or wire) or a wireless connection (communicating wirelessly with a networking device, such as through visible light, infrared, or one or more radiofrequencies.

The computing device 1102 may include one or more input components 1114, such as keyboard, mouse, pen, voice input device, touch input device, infrared cameras, or video input devices, and/or one or more output components 1112, such as one or more displays, speakers, and printers. The input components 1114 and/or output components 1112 may be connected to the computing device 1102 via a wired connection, a wireless connection, or any combination thereof. In one embodiment, an input component 1114 or an output component 1112 from another computing device may be used as input components 1114 and/or output components 1112 for the computing device 1102.

The components of the computing device 1102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of the computing device 1102 may be interconnected by a network. For example, the memory component 1108 may be comprised of multiple physical memory units located in different physical locations interconnected by a network.

Those skilled in the art will realize that storage devices utilized to store computer readable instructions may be distributed across a network. For example, a computing device 1120 accessible via a network 1118 may store computer readable instructions to implement one or more embodiments provided herein. The computing device 1102 may access the computing device 1120 and download a part or all of the computer readable instructions for execution. Alternatively, the computing device 1102 may download pieces of the computer readable instructions, as needed, or some instructions may be executed at the computing device 1102 and some at computing device 1120.

F. Usage of Terms

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of diagnosing service quality of an activity of a service provided by a source to a user of a computer having a processor, the method comprising:
   executing instructions on the processor that cause the computer to:
   identify a service path of a performance of the activity of the service from the source to the user;
   identify at least two segments in the service path over which the performance of the activity of the service is provided to the user;
   for respective segments of the service path, measure a service quality metric of the activity along the segment during the performance of the activity of the service for the user;
   compare the service quality metrics of the respective segments of the activity during the performance of the activity of the service for the user to identify at least one selected segment having a poor service quality metric; and
   for the respective at least one selected segment having a poor service quality metric, evaluate an effect of the poor service quality metric of the selected segment on the activity to identify a poor quality segment that contributes to the poor service quality of at least one activity of the service during the performance of the activity of the service for the user; and
   inform the user of the poor quality segment that contributes to the poor service quality of the performance of the activity of the service for the user.

2. The method of claim 1, respective segments of the service path of the activity having a segment type selected from a segment type set comprising:
   a server data center segment type;
   an infrastructural network segment type;
   a local carrier network segment type;
   a user network segment type; and
   a user client segment type.

3. The method of claim 1:
   at least one network segment of the service path spanning two locations; and
   segmenting the service path comprising: segmenting the network segment into network location segments respectively representing the locations spanned by the network segment.

4. The method of claim 1:
   the activity of the service comprising at least two components respectively provided by a source;
   identifying the service path of the activity comprising: for respective components of the activity, identifying a component path for the component from the source of the component to the user;
   identifying the segments of the service path comprising: for respective component paths, segmenting the component path into at least two segments;
   measuring the service quality metrics comprising: for respective segments of the component paths, measuring a service quality metric of the component provided along the component path; and
   identifying the service quality of the activity comprising:
   for respective components of the activity, identifying a component quality of the components according to the service quality metrics of the segments of the component path providing the component service; and
   identifying the service quality of the activity according to the service quality metrics of the segments of the component paths of the activity.

5. The method of claim 1:
   the service provided by at least one server; and
   measuring the service quality metrics of the segments of the service paths of an activity of the service comprising:
   installing on at least one server a service quality measuring client configured to measure service quality metrics of at least one segment of the service paths of the activities; and
   receiving from the service quality measuring client at least one service quality metric of the segment detected during uses by at least one user of activities having service paths involving the segment.

6. The method of claim 1:
   the activity accessed by respective users through a device; and
   measuring the service quality metrics of the segments of the service paths of an activity comprising:
   installing on the device a service quality measuring client configured to measure service quality metrics of the segments of the service paths of the activities; and
   receiving from the service quality measuring client at least one service quality metric of the segment detected during use of activities having service paths including the segment.

7. The method of claim 1:
   at least one segment of at least one service path of at least one activity provided by a service provider; and
   measuring the service quality metrics of the segment comprising: receiving from the service provider service quality metrics of the segment detected during uses of activities having service paths including the segment.

8. The method of claim 1, measuring the service quality metrics of the segment of the service path of an activity comprising:
   enabling an activity simulating service to:
   generate simulated uses of the activity of the service, and
   measure the service quality metrics of the activity during simulated uses of the activity; and
   receiving from the activity simulating service quality metrics of the segment detected during simulated uses of activities having service paths including the segment.

9. The method of claim 1:
   the activity accessed by respective users; and
   measuring the service quality metrics of the segments of the service paths of an activity comprising:
   receiving from a user a service quality metric of the activity; and
   applying the service quality metric as service quality metrics of the segments of the service paths of the activity.

10. The method of claim 1:
    respective activities associated with an activity identifier;

the instructions configured to, upon using a segment of a service path to provide an activity, associate the activity identifier of the activity with the segment; and
identifying the service path of an activity comprising:
identifying segments associated with the activity identifier of the activity.

11. The method of claim 1, the instructions configured to identify a poor quality segment by identifying a segment exhibiting a poor service quality metric below a service quality metric threshold of the identified segment.

12. The method of claim 11, detecting the poor service segment quality metric of a segment of service path of an activity comprising:
upon detecting a poor service quality metric of an activity of the service that is performable by a user:
identifying the service path of the activity performable by the user;
identifying the segments segmenting the service path providing the activity to the user;
for respective segments of the service path, measuring the service quality metrics of the segments of the service path of the activity; and
identifying at least one segment having a poor service quality metric below a service quality metric threshold and contributing to the poor service quality metric of the activity of the service.

13. The method of claim 11, the instructions configured to:
for respective segments, identify at least one dependency of the segment on at least one other segment of the segment path; and
upon detecting the poor service quality metric of an identified segment, determine whether the poor service quality metric of the identified segment is caused by the service quality of at least one other segment with which the identified segment has a dependency.

14. The method of claim 11:
the service administrated by at least one administrator; and
the instructions configured to, upon detecting a poor service quality metric below a service quality metric threshold for a segment of the service path of the activity, alert the administrator of the poor service quality metric of an identified segment.

15. The method of claim 11:
the activity provided for respective users along a service path; and
the instructions configured to, upon detecting a poor service quality metric below a service quality metric threshold for a segment of the service path of the activity, identify users performing the activity along a service path including an identified segment.

16. The method of claim 15, the instructions configured to detect a user response of the users of the activity to the poor service quality metric of the segment within the service path of the activity.

17. The method of claim 11:
the activity provided, for respective users of a user set, along a service path; and
the instructions configured to, upon detecting a poor service quality metric below a service quality metric threshold for a segment of the service path of the activity:
identify at least one user of activities having service paths including an identified segment; and
notify identified users of the activities of the identified segment having the poor service quality metric.

18. The method of claim 1, the instructions configured to:
upon measuring a first service quality metric of a segment, store the first service quality metric as a historical service segment quality metric of the segment; and
upon measuring a second service quality metric of the segment:
compare the second service quality metric of the segment with historical service segment quality metrics of the segment; and
identify a service quality metric change in the service quality metrics of the segment.

19. A device that reports to a user a service quality of a service comprising an activity provided by a source to the user, the device comprising:
a processor; and
a memory storing instructions that, when executed by the processor, provide a system comprising:
an activity evaluator that:
identifies a service path of a performance of the activity of the service from the source to the user;
identifies at least two segments in the service path over which the performance of the activity of the service is provided to the user;
for respective segments of the service path, measures a service quality metric of the activity provided along the segment during the performance of the activity of the service for the user;
compares the service quality metrics of the respective segments of the activity during the performance of the activity of the service for the user to identify at least one selected segment having a poor service quality metric; and
for the respective at least one selected segment having a poor service quality metric, evaluates an effect of the poor service quality metric of the selected segment on the activity to identify a poor quality segment that contributes to the poor service quality of at least one activity of the service during the performance of the activity of the service for the user; and
a service quality informer that informs the user of the poor quality segment that contributes to the poor service quality of at least one activity of the service during the performance of the activity of the service for the user.

20. A server that provides to a user a service the service comprising activities provided by sources, the server comprising:
a processor; and
a memory storing instructions that, when executed by the processor, provide a system comprising:
a service quality evaluator that:
identifies a service path of a performance of an activity of the service from the source to the user;
identifies at least two segments in the service path path over which the performance of the activity of the service is provided to the user;
for respective segments of the service path, measure a service quality metric of the activity provided along the segment during the performance of the activity of the service for the user;
compares the service quality metrics of the respective segments of the activity during the performance of the activity of the service for the user to identify at least one selected segment having a poor service quality metric; and for the respective at least one selected segment having a poor service quality metric, evaluate an effect of the poor service quality metric of the selected segment on the activity to identify a poor quality segment that contributes to the poor service quality of at least one activity of the service during the performance of the activity of the service for the user; and a service quality informer that informs the user of the poor quality segment that contributes to the poor service quality of at least one activity of the service during the performance of the activity of the service for the user.

\* \* \* \* \*